United States Patent
Lipka

(10) Patent No.: US 11,755,681 B2
(45) Date of Patent: Sep. 12, 2023

(54) REAL-TIME EQUIVALENT USER INTERACTION GENERATION

(71) Applicant: Salesforce, Inc., San Francisco, CA (US)

(72) Inventor: Hendrik Lipka, Jena (DE)

(73) Assignee: Salesforce, Inc., San Francisco, CA (US)

( * ) Notice: Subject to any disclaimer, the term of this patent is extended or adjusted under 35 U.S.C. 154(b) by 191 days.

(21) Appl. No.: 16/834,396

(22) Filed: Mar. 30, 2020

(65) Prior Publication Data

US 2021/0303655 A1 Sep. 30, 2021

(51) Int. Cl.
- *G06F 3/048* (2013.01)
- *G06F 16/958* (2019.01)
- *G06F 21/64* (2013.01)
- *G06F 40/103* (2020.01)

(52) U.S. Cl.
CPC ............ *G06F 16/986* (2019.01); *G06F 3/048* (2013.01); *G06F 21/64* (2013.01); *G06F 40/103* (2020.01)

(58) Field of Classification Search
CPC ........ G06F 3/048; G06F 16/986; G06F 21/64; G06F 40/103
See application file for complete search history.

(56) References Cited

U.S. PATENT DOCUMENTS

| | | | |
|---|---|---|---|
| 10,386,985 B2* | 8/2019 | Ciano | G06F 3/0482 |
| 10,474,416 B1* | 11/2019 | Farivar | H04L 67/025 |
| 2011/0252316 A1* | 10/2011 | Pahud | G06F 40/58 715/753 |
| 2014/0301250 A1* | 10/2014 | Uzelac | H04L 12/1818 370/261 |
| 2017/0090853 A1* | 3/2017 | Khalatian | G06F 9/542 |
| 2018/0234545 A1* | 8/2018 | Barak | G06Q 30/0201 |

* cited by examiner

*Primary Examiner* — Kyle R Stork
(74) *Attorney, Agent, or Firm* — Holland & Hart LLP

(57) ABSTRACT

A method, apparatus, and system for data processing to support real-time equivalent user interaction generation is described. To support real-time equivalent user interaction generation, a user's interactions with a first user interface of an application at a first user device are identified, the identified user's interactions with the first user interface of the application at the first user device may be converted into equivalent user interactions with a second user interface of the application based at least in part on a configuration of the second user interface of the application at a second user device, and the equivalent user interactions with the second user interface of the application at the second user device may be implemented, wherein the configuration of the second user interface of the application at the second user device and a configuration of the first user interface of the application at the first user device are different.

20 Claims, 13 Drawing Sheets

REAL-TIME EQUIVALENT USER INTERACTION GENERATION

FIELD OF TECHNOLOGY

The present disclosure relates generally to database systems and data processing, and more specifically to real-time equivalent user interaction generation.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support sharing of user interfaces between devices in communication with the cloud platform using data stored or processed by the cloud platform. For example, a guide or driver may share their screen with a trainee or listener to show the trainee how to perform certain tasks or to work collaboratively. However, the users that are observing the guide's shared screen may be distinct and disparate in both geography and language from the guide, which may result in the trainee or listener being unable to comprehend the actions being taken by the guide. Additionally, in some cases, a direct translation of objects present at the guide's application may not correlate correctly to objects displayed on the trainee or listener's user interface, which may limit effective communication, training, and collaboration between the guide and the trainee or listener.

DETAILED DESCRIPTION

Figure 1:
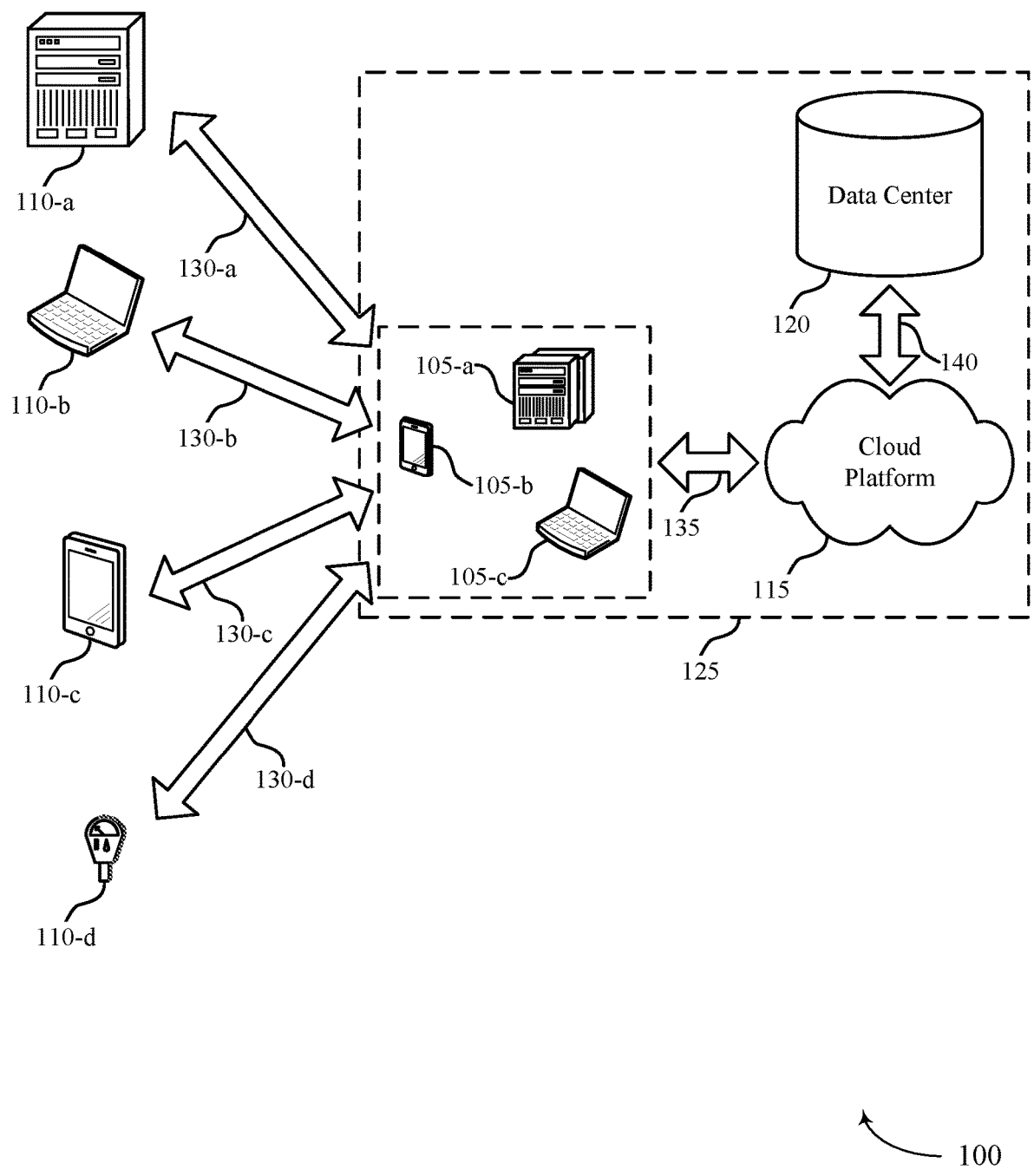
FIG. 1 illustrates an example of a system for data processing that supports real-time equivalent user interaction generation in accordance with aspects of the present disclosure.

A cloud platform may support use of real-time equivalent user interaction generation utilizing data stored or processed by the cloud platform. For example, a cloud platform may support converting a first user/trainer's interactions with the trainer's user interface of the trainer's user device into interactions with a second user/customer's user interface at a customer's user device that are equivalent in function to the trainer's interactions while the customer is able to follow along in their native user interface with the application in real-time.

The system may identify the trainer's interactions with the trainer's user interface of the application at the trainer's user device in real time. The system may then convert the trainer's interactions with the trainer's user interface into equivalent customer interactions with the customer's user interface based at least in part on a configuration of the customer's user interface of the application at the customer's user device. The system may then implement the resulting equivalent user interactions with the customer's user interface of the application at the customer's user device in real time.

In accordance with aspects of the present disclosure, techniques are described to identify a trainer's interactions with the trainer's user interface and to convert the identified trainer's interactions into interactions that are equivalent to interactions at a customer or trainee's user interface, as well as implement the converted interactions at the trainee's user interface. Such techniques facilitate using generated real-time equivalent interactions to facilitate training and interactions between a trainer and one or more customers or users that may be distinct and disparate in one or more of geography, native language, or user interface configuration.

The described techniques include using extensions to identify and capture user interactions. A first extension may identify the user's interactions at the first user interface and may transmit the identified user's interactions to a second extension at the second user interface via a server in communication with both of the first user device and the second user device. In some cases, an additional extension associated with the first user interface may identify actions occurring at the application at the first user device that are separate from the user's interactions (such as security checks, client-side validations, etc.) and may transmit the identified actions to another extension within the server. The server-side extension may perform the identified actions on behalf of the application at the second user device as if the application at the second user device had performed the actions, and the server-side extension may transmit the identified actions to the application at the second user device.

In some cases, the server may establish initial communications between the first user device and the second user device and then all further information transfer between the first user device and the second user device may be conducted directly between the first user device and the second user device. In other cases, the first user device and the second user device may establish communications between themselves (and the corresponding extensions) without the assistance of a centralized server. Additionally, the first extension may communicate both the input actions and any associated data directly to an extension that then communicates the input actions and the associated data from the first user device to the extension at the second user device as part of a "mirroring" mode.

Aspects of the disclosure are initially described in the context of an environment supporting an on-demand database service. Additional aspects are described with reference to a systems that support real-time equivalent user interaction generation. Aspects of the disclosure are further illustrated by and described with reference to apparatus diagrams, system diagrams, and flowcharts that relate to real-time equivalent user interaction generation.

FIG. 1 illustrates an example of a system 100 for cloud computing that supports real-time equivalent user interaction generation in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Techniques are described herein to support real-time equivalent user interaction generation. The techniques may provide for identifying a trainer's interactions with the trainer's user interface and converting the identified trainer's interactions into interactions that are equivalent to interactions at a customer or trainee's user interface, as well as implementing the converted interactions at the trainee's user interface. Such techniques facilitate using generated real-time equivalent interactions to facilitate training and interactions between a trainer and one or more customers or users that may be distinct and disparate in one or more of geography, native language, or user interface configuration.

The system 100, including the cloud platform 115, may support generation of real-time equivalent user interactions with a user interface that are not merely mirrored or directly translated interactions without considering a context or configuration of the user interface at which the equivalent interactions are to be implemented. For example, interactions with a first user interface of an application by a trainer or driver user may be identified, by at least a portion of the system 100, and may be converted, in real-time (i.e., substantially simultaneously, within milliseconds, etc.), into interactions with a second user interface of the application that are equivalent in scope, context, and function. The system 100 may also transmit the converted equivalent interactions to the second user interface of the application for implementation at the second user interface and display to a trainee or customer user. The system 100 may additionally identify, capture, and convert into equivalent actions, actions taken by the application at the first user interface of the application which may be handled solely by the application without user input, such as client-side validations, and may then transmit the converted actions and implement the converted actions at the second user interface of the application, as described herein.

Generation of real-time equivalent user interactions with a user interface of an application of a system may include synchronizing or coordinating the user interfaces of a trainer and a trainee. In some examples, when the trainer performs an interaction (e.g., enters data, selects an option on the user interface of the application, etc.) with an application at a trainer's user interface, an equivalent user interaction may be performed, automatically, with the application at a trainee's user interface for the trainee to observe. The two user interfaces may be located in different geographical areas and the language of the application being used by the trainer may be different than the language of the application being used by the trainee. Accordingly, the trainer may guide the trainee through the use of the application despite geographical, language, or other differences between the trainer and the trainee.

By implementing guided equivalent user interfaces that are not merely mirror images of each other or simplistic direct translations in order to support real-time equivalent user interaction generation, the user experience and training effectiveness using digital training environments may improve by more efficiently and effectively generating equivalent user interface that most closely mimic each other in scope, context, and experience.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
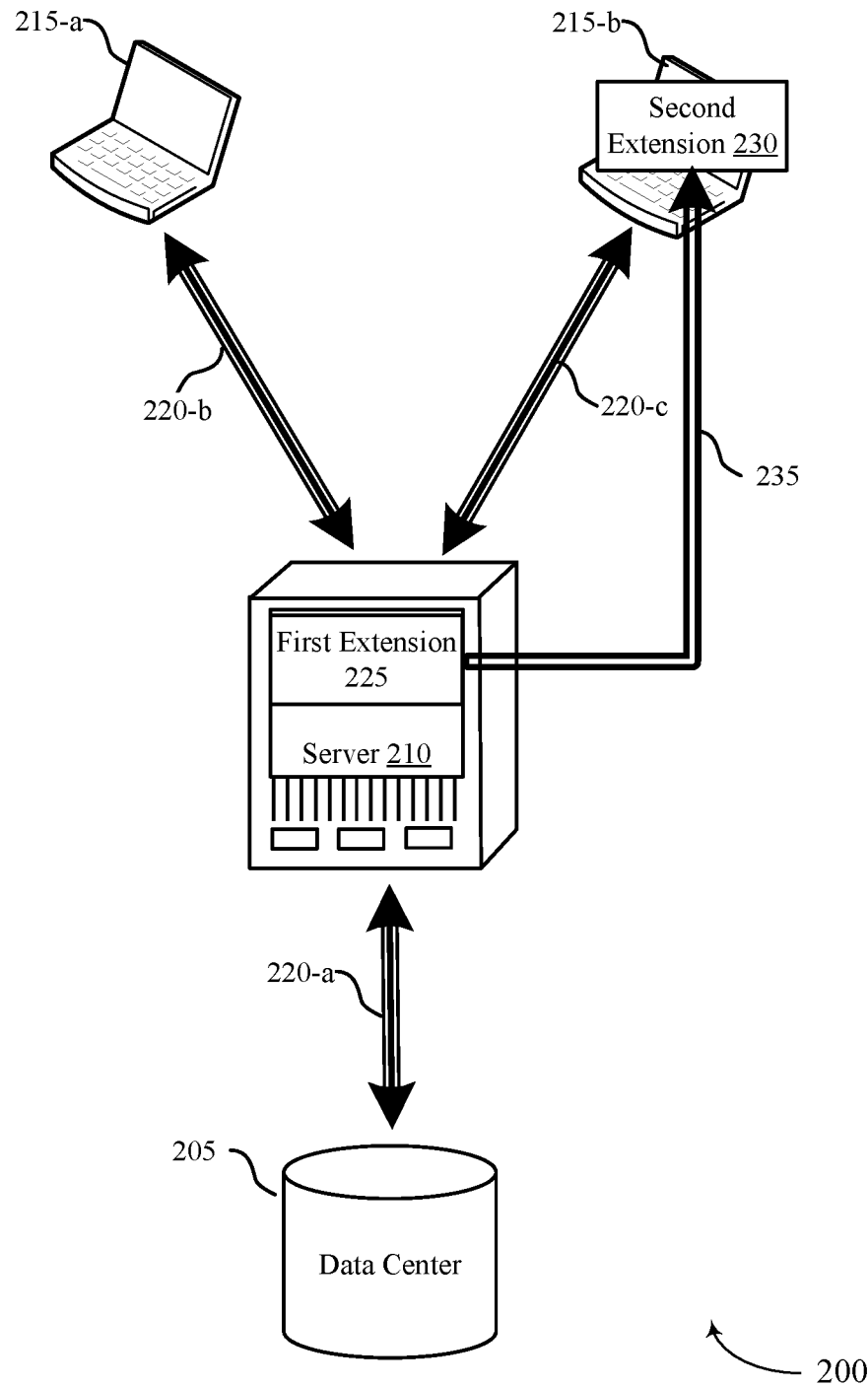
FIG. 2 illustrates an example of a system that supports real-time equivalent user interaction generation in accordance with aspects of the present disclosure.

FIG. 2 illustrates an example of a system 200 that supports real-time equivalent user interaction generation in accordance with aspects of the present disclosure. The system 200, which may be an example of a system for data processing, includes a data center 205, a server 210, and two user devices 215. The system 200 may implement aspects of the system 100 as described with reference to FIG. 1 to support real-time equivalent user interaction generation to facilitate guiding through, training with, or presentation of an application or information associated with the application using data stored or processed by a cloud platform, for example, the cloud platform 115. For example, the server 210 may be an example of a single server, a server cluster, a database server, a cloud-based server, a virtual machine, a container, or any other device or system that supports data processing. The server 210 may be a central server that stores at least a portion of the data relevant to the system 200 and may exchange certain data with the user devices 215 via the server connections 220. Additionally, the user devices 215 may be examples of cloud clients 105 or contacts 110, and the data center 205 may implement aspects of one or more of the data center 120 or cloud platform 115 as described with reference to FIG. 1, for example.

The system 200 further includes a first extension 225 located on the server 210, a second extension 230 located on the second user device 215-b, server connections 220 extending between the server 210 and the data center 205 and between the server 210 and the user devices 215, and an extension connection 235 extending between the first extension 225 and the second extension 230. Each of the first extension 225 and the second extension 230 may be one or more of an auxiliary executable file (e.g., a dynamic link library (DLL)), a supplementary routine configured to add capabilities to a respective one of the guide application or the guided application, or a supplementary format that adds options in a data set. Each of the server connections 220 and the extension connection 235 are examples of communication connections configured for transmitting electromagnetic energy between the respective components of the system 200. In some examples, one or more of the server connections 220 or the extension connection 235 may be a wireless connection. In some examples, one or more of the server connections 220 or the extension connection 235 may be a non-wireless connection (e.g., a land-line, a fiber optic connection, etc.).

Each of the user devices 215 includes an application that is presented to a respective user via a user interface of the application on a display of each of the user devices 215. In this example, a first user may interact with the application, which may be an example of a training application or any other type of application, via a user interface of the first user device 215-a. The application at the first user device 215-a is an example of a driver application, and the application at the second user device 215-b is an example of a listener application. The driver application at the first user device 215-a may serve as a guide, or trainer, application and the listener application at the second user device 215-b may serve as a guided, or trainee, application.

The guide application at the first user device 215-a may receive one or more user's interactions from the first user and may transmit the input user interactions to the server 210 via the server connection 220-b. Such user's interactions may include any type of interaction, by the user of the first user device 215-a, with the application at the first user device 215-a. For example, such user interaction's may include touch inputs, typing inputs, mouse/stylus inputs, voice inputs, gesture inputs, or a combination thereof by the user of the first user device 215-a. The user may input the user's interactions with the application at the first user device 215-a in provided locations within the application, such as data entry boxes, user prompts, drop-down menus, or any combination thereof. Once the input user's interactions have reached the server 210, the user's interactions may be received by the first extension 225 prior to the user's interactions being executed by the server 210. The guide application may additionally perform additional tasks, or actions, that do not require user input, such as client-side validation of input data or presentation of error messages associated with the user's interactions. In some examples, such actions may be transmitted to the server 210, but not received by the first extension 225. The first extension 225 may capture the user's interactions and may transmit the user's interactions to the second extension 230 at the second user device 215-b via the extension connection 235. In some examples, the first extension 225 may transmit the captured user's interactions directly to the guided application at the second user device 215-b, and the guided application at the second user device 215-b may deliver the captured user's interactions to the second extension 230. In other examples, the first extension 225 may transmit the captured user's interactions to one of the guided application at the second user device 215-b or the second extension 230 via the server connection 220-c.

The second extension 230 may convert the captured user's interactions into equivalent user interactions with the second interface of the application, i.e., the guided application, at the second user device 215-b. The second extension 230 may convert the user's interactions into the equivalent user interactions based at least in part on a configuration of the second user interface of the application at the second user device 215-b. In some examples, the configuration of the second user interface of the application at the second user device 215-b may include a display size on which the second user interface of the application is displayed, a language (e.g., English, German, Mandarin, etc.) used by the second interface of the application, a privilege level of the second user at the second interface of the application, or a user device 215 type, for example. In some examples, the first extension 225 may convert, based at least on the configuration of the second user interface of the application at the second user device 215-b, the captured user's interactions into equivalent user interactions with the second interface of the application and may then transmit the equivalent to one of the application at the second user device 215-b or the second extension 230.

As discussed herein, each of the first extension 225 or the second extension 230 may convert user's interactions into the equivalent user interactions based at least in part on a configuration of the second user interface of the application at the second user device 215-b. More specifically, a user's interactions with a first user interface of the application may be modified (i.e., converted) into interactions that will cause one or more functionally equivalent actions to be taken at the second user interface of the application. For example, the first user interacting with the application at the first user device 215-a may be interacting with an English language version of the application and be a system administrator, or have an increased level of system privileges. In such an example, the second user interacting with the application at the second user device 215-b may be interacting with a German language version of the application and may not have a level of system privileges that are commensurate with the level of system privileges possessed by the first user. Accordingly, the first user interface of the application at the first user device 215-a may have option selections, data entry points, or words that are not present or are different at the second user interface of the application at the second user device 215-b. For example, the second user interface of the application at the second user device 215-b may not display options related to human resources, business financials, or other privacy-related data that may be displayed on the first user interface of the application at the first user device 215-a.

In the example described above, the first user interacting with the first user interface of the application at the first user device 215-a may input one or more user's interactions to the first user interface of the application to cause an action to be carried out. The action may be to select an option from a menu, to enter data into a data entry location, or to navigate to a location within the application, for example. Because the user interface of the application seen by the second user at the second user device 215-b may be different in configuration (i.e., may lack specific options, may have a different menu, may have additional steps to arrive at a functionally equivalent location) due to the reasons discussed above, the user's interactions may be converted into equivalent user interactions by one of the first extension 225 or the second extension 230. Such a conversion of the user's interactions into the equivalent user interactions may yield interactions that will cause one or more functionally equivalent actions to be taken at the second user interface of the application at the second user device 215-b when implemented as described below.

The second extension 230 may implement the equivalent user interactions with the guided application at the second user device 215-b. In some examples, the equivalent user interactions may not be the same as the user's interactions received at the guide application at the first user device 215-b. In such examples, as described above, the equivalent user interactions may be different from the user's interactions because the configuration of the guide application at the first user device 215-a is different from the configuration of the guided application at the second user device 215-b.

Figure 3:
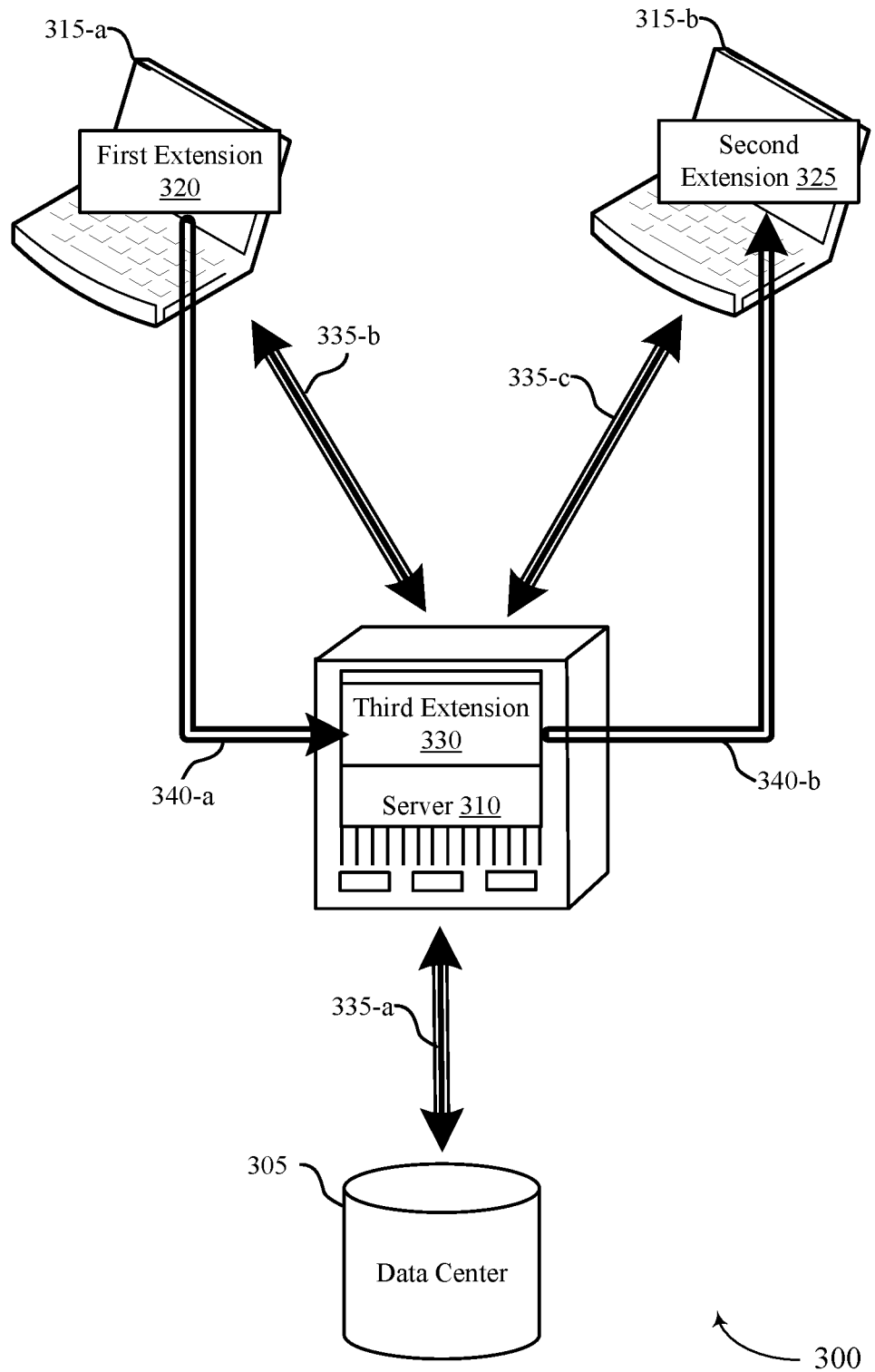
FIG. 3 illustrates an example of a system that supports real-time equivalent user interaction generation in accordance with aspects of the present disclosure.

FIG. 3 illustrates an example of a system 300 that supports real-time equivalent user interaction generation in accordance with aspects of the present disclosure. The system 300, which may be an example of a system for data processing, includes a data center 305, a server 310, and two user devices 315. The system 300 may implement aspects of the systems 100 or 200 as described with reference to FIGS. 1 and 2 to support real-time equivalent user interaction generation to facilitate guiding through, training with, or presentation of an application or information associated with the application using data stored or processed by a cloud platform, for example, the cloud platform 115. For example, the server 310 may be an example of a single server, a server cluster, a database server, a cloud-based server, a virtual machine, a container, or any other device or system that supports data processing. The server 310 may be a central server that stores at least a portion of the data relevant to the system 300 and may exchange certain data with the user devices 315 via the server connections 335. Additionally, the user devices 315 may be examples of cloud clients 105 or contacts 110, and the data center 305 may implement aspects of one or more of the data center 120 or cloud platform 115 as described with reference to FIG. 1, for example.

Each of the user devices 315 includes an application that is presented to a respective user via a user interface of the application on a display of each of the user devices 315. In this example, a first user may interact with the application, which may be an example a training application or any other type of application, via a user interface of the first user device 315-a. A second user may interact with the application via a user interface of the second user device 315-b. The application at the first user device 315-a may be an example of a driver application, and the application at the second user device 315-b may be an example of a listener application. The driver application at the first user device 315-a may serve as a guide, or trainer, application and the listener application at the second user device 315-b may serve as a guided, or trainee, application.

The system 300 further includes a first extension 320 of the guide application at the first user device 315-a, a second extension 325 of the guided application at the second user device 315-b, a third extension 330 of the application located at the server 310, server connections 335 extending between the server 310 and the data center 305 and between the server 310 and the user devices 315, and extension connections 340 extending between the first extension 320 and the third extension 330 and between the third extension 330 and the second extension 325. Each of the first extension 320, the second extension 325, and the third extension 330 may be one or more of an auxiliary executable file (e.g., a dynamic link library (DLL)), a supplementary routine configured to add capabilities to a respective one of the guide application or the guided application, or a supplementary format that adds options in a data set.

The server connections 335 and the extension connections 340 may be examples of communication connections configured for transmitting electromagnetic energy between the respective components of the system 300. In some examples, one or more of the server connections 335 or the extension connections 340 may be wireless connections. In some examples, one or more of the server connections 335 or the extension connections 340 may be non-wireless connections (e.g., a land-line, a fiber optic connection, etc.).

The guide application at the first user device 315-a may receive one or more user's interactions from the first user. The first extension 320 may capture all application-side actions, including the received one or more user's interactions and non-user actions (e.g., client-side validation of input data, additional client-side validations, application security checks, etc.) and may transmit both of the input user's interactions and the non-user actions directly to the third extension 330 via the extension connection 340-a. In some cases, the input user's interactions and the non-user actions may be sent to the server 310 via the extension connection 340-a and then may be received by the third extension 330.

The third extension 330 may receive the user's interactions and non-user actions and may transmit both of the user's interactions and the non-user actions to the second extension 325 of the guided application at the second user device 315-b via the extension connection 340-b. In some examples, the third extension 330 may transmit the user's interactions and the non-user actions directly to the guided application at the second user device 315-b, and the guided application at the second user device 315-b may deliver the user's interactions and the non-user actions to the second extension 325. In other examples, the third extension 330 may transmit some or all of the user's interactions and the non-user actions to one of the guided application at the second user device 315-b or the second extension 325 via the server connection 335-c.

The third extension 330 may convert the user's interactions into equivalent user interactions with the second interface of the application (i.e., the guided application) at the second user device 315-b. The third extension 330 may convert the user's interactions into the equivalent user interactions based at least in part on a configuration of the second user interface of the application at the second user device 315-b. In some examples, the configuration of the second user interface of the application (i.e., the guided application) at the second user device 315-b may include a display size on which the second user interface of the application is displayed, a language (e.g., English, German, Mandarin, etc.) used by the second interface of the application, a privilege level of the second user at the second interface of the application, or a user device 315 type, for example.

In some examples, one of the first extension 320 or the second extension 325 may convert, based at least on the configuration of the second user interface of the application at the second user device 315-b, the user's interactions into equivalent user interactions with the guided application at the second user device 315-b. In examples where the first extension 320 converts the user's interactions into equivalent user interactions with the guided application at the second user device 315-b, the first extension 320 may transmit the resulting equivalent user interactions to the second extension 325 via the extension connections 340 and the third extension 330.

In some cases, the third extension 330 may convert the non-user actions into equivalent actions of the guided application at the second user device 315-b. The third extension 330 may convert the non-user actions into the equivalent actions of the guided application at the second user device 315-b based at least in part on a configuration of the second user interface of the application at the second user device 315-b. In some examples, the configuration of the second user interface of the application (i.e., the guided application) at the second user device 315-b may include a display size on which the second user interface of the application is displayed, a language (e.g., English, German, Mandarin, etc.) used by the second interface of the application, a user device 315 type, a privilege level of the second user using the guided application or any other quantitative or qualitative object or value associated with client-side validation or security of the system 300. In some examples, one of the first extension 320 or the second extension 325 may convert, based at least on the configuration of the second user interface of the application at the second user device 315-b, the non-user actions into equivalent actions of the guided application at the second user device 315-b.

In some cases, one or both of the guide application or the guided application may include an internet browser. In such cases, one or both of the first extension 320 or the second extension 325 may be injected into the respective internet browser application. For example, the server 310 may create and transmit HyperText Markup Language (HTML) or JavaScript to one or both of the guide application or the guided application. As part of creating the HTML or JavaScript, the server 310 may inject a JavaScript-based extension into one or both of the created guide application or the guided application. In some cases, where injection of one of the first extension 320 or the second extension 325 into a browser-based application may not be desirable or practical, for example, because manipulating the internet application from the server side may be difficult or because JavaScript may not be used, a browser extension may be utilized. In such cases, one or both of the first extension 320 of the guide application or the second extension 325 of the guided application may be a browser extension. In such cases, the first extension 320 of the guide application at the first user device 315-a may request access to all input actions at the internet browser application, and may further capture all input user's interactions at the internet browser and then send the captured interactions to the second extension 325 of the guided application via the third extension 330 or the server 310 as described herein. The second extension 325 of the application at the second user device 315-b may receive the captured interactions as described herein and may implement them at the internet browser of the application at the second user device 315-b.

Figure 4:
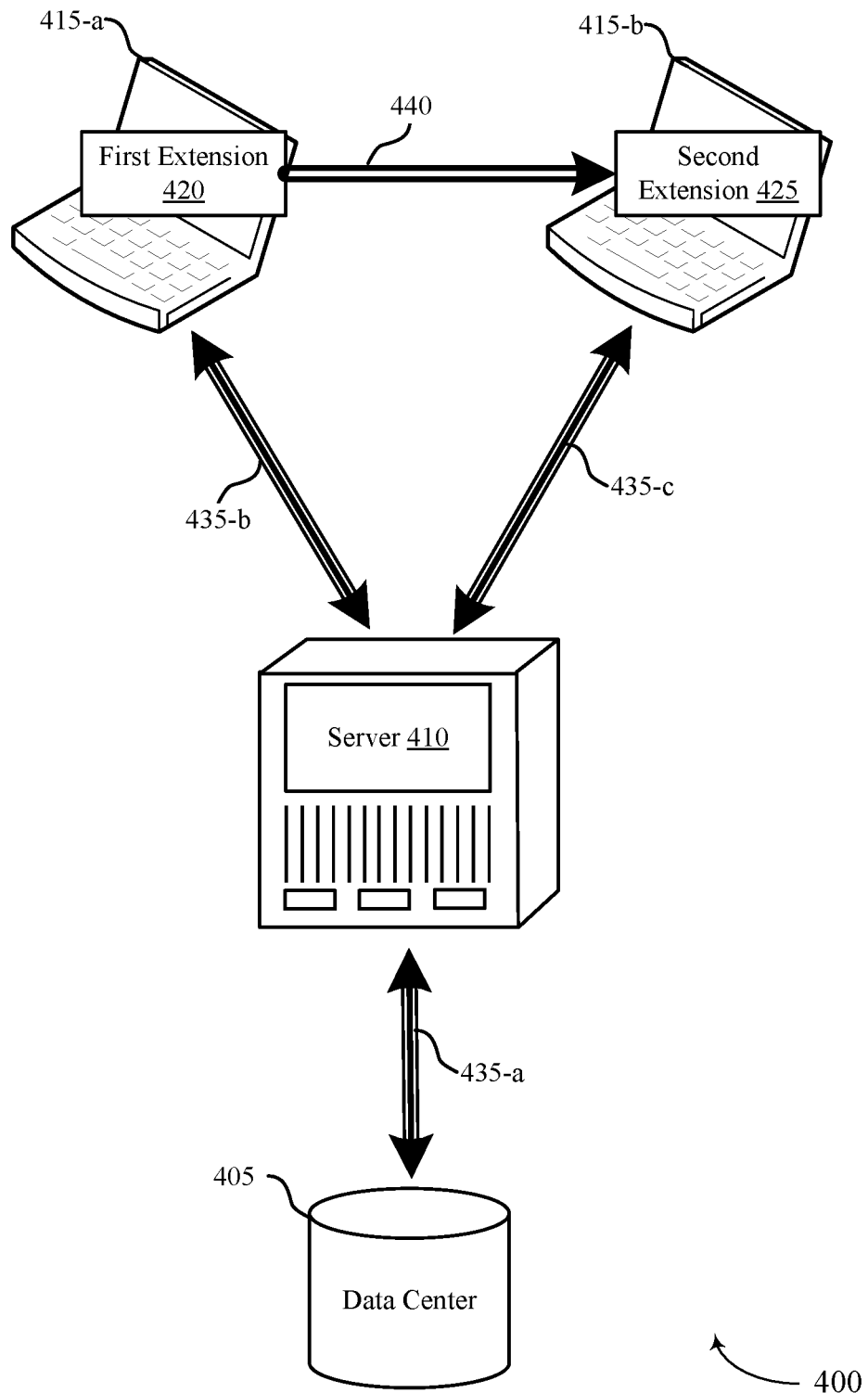
FIG. 4 illustrates an example of a system that supports real-time equivalent user interaction generation in accordance with aspects of the present disclosure.

FIG. 4 illustrates an example of a system 400 that supports real-time equivalent user interaction generation in accordance with aspects of the present disclosure. The system 400, which may be an example of a system for data processing, includes a data center 405, a server 410, and two user devices 415. The system 400 may implement aspects of the systems 100, 200, or 300 as described with reference to FIGS. 1-3 to support real-time equivalent user interaction generation to facilitate guiding through, training with, or presentation of an application or information associated with the application using data stored or processed by a cloud platform, for example, the cloud platform 115. For example, the server 410 may be an example of a single server, a server cluster, a database server, a cloud-based server, a virtual machine, a container, or any other device or system that supports data processing. The server 410 may be a central server that stores at least a portion of the data relevant to the system 400 and may exchange certain data with the user devices 415 via the server connections 435. Additionally, the user devices 415 may be examples of cloud clients 105 or contacts 110, and the data center 405 may implement aspects of one or more of the data center 120 or cloud platform 115 as described with reference to FIG. 1, for example.

Each of the user devices 415 includes an application that is presented to a respective user via a user interface of the application on a display of each of the user devices 415. In this example, a first user may interact with the application, which may be an example a training application or any other type of application, via a user interface of the first user device 415-*a*. A second user may interact with the application via a user interface of the second user device 415-*b*. The application at the first user device 415-*a* may be an example of a driver application, and the application at the second user device 415-*b* may be an example of a listener application. The driver application at the first user device 415-*a* may serve as a guide, or trainer, application and the listener application at the second user device 415-*b* may serve as a guided, or trainee, application.

The system 400 further includes a first extension 420 of the guide application at the first user device 415-*a* and a second extension 425 of the guided application at the second user device 415-*b*, server connections 435 extending between the server 410 and the data center 405 and between the server 410 and the user devices 415, and extension connection 440 extending between the first extension 420 and the second extension 425. Each of the first extension 420 and the second extension 425 may be one or more of an auxiliary executable file (e.g., a dynamic link library (DLL)), a supplementary routine configured to add capabilities to a respective one of the guide application or the guided application, or a supplementary format that adds options in a data set.

In the example illustrated in FIG. 4, each of the guide application and the guided application at respective user devices 415 are in communication with the server 410 via the respective server connections 435, as well as being in communication with each other via the extension connection 440 extending between the first extension 420 and the second extension 425. By virtue of both of the guide application and the guided application being in communication with the same server, server 410, neither of the guide application at the first user device 415-*a* or the guided application at the second user device 415-*b* needs to be previously known to each other. In such cases, the server 410 may provide address and connection details, as well as any additional required information, to both of the guide application at the first user device 415-*a* and the guided application at the second user device 415-*b* to facilitate creation of the extension connection 440 between the first extension 420 of the guide application and the second extension 425 of the guided application.

In some cases, neither of the guide application at the first user device 415-*a* or the guided application at the second user device 415-*b* may be in communication with the server 410. Additionally, neither of the guide application at the first user device 415-*a* or the guided application at the second user device 415-*b* may know an address or other connection details of the other application and each may additionally be present in separate networks. In such cases, to establish the extension connection 440 between the first extension 420 of the guide application and the second extension 425 of the guided application, the connection may be manually configured or may be facilitated through the use of a discovery mechanism. Such a discovery mechanism may include a Universal Plug and Play (UPnP) set of networking protocols or a zero-configuration networking (ZeroConf) set of technologies, for example. Additionally, in such cases where neither of the guide application or the guided application are in communication with the server 410, all data utilized or otherwise interacted with by the guide application or the first extension 420 of the guide application at the first user device 415-*a* may be transmitted to the second extension 425 of the guided application at the second user device 415-*b* via the extension connection 440. Such transmittal of all involved data as part of the guide/guided application process is indicated because of the lack of a connection between either of the guide application or the guided application and the server 410.

The server connections 435 and the extension connection 440 may be examples of communication connections configured for transmitting electromagnetic energy between the respective components of the system 400. In some examples, one or more of the server connections 435 or the extension connection 440 may be wireless connections. In some examples, one or more of the server connections 435 or the extension connection 440 may be non-wireless connections (e.g., a land-line, a fiber optic connection, etc.).

The guide application at the first user device 415-*a* may receive one or more user's interactions from the first user. The first extension 420 may capture all application-side actions, including the received one or more user's interactions and non-user actions (e.g., client-side validation of input data, additional client-side validations, application security checks, etc.) and may transmit both of the input user's interactions and the non-user actions directly to the second extension 425 via the extension connection 340.

The second extension 425 may receive the user's interactions and non-user actions and via the extension connection 440. In some examples, the first extension 420 may transmit the user's interactions and the non-user actions directly to the guided application at the second user device 415-*b*, and the guided application at the second user device 415-*b* may deliver the user's interactions and the non-user actions to the second extension 425.

The second extension 425 may convert the user's interactions into equivalent user interactions with the second interface of the application (i.e., the guided application) at the second user device 415-*b*. The second extension 425 may convert the user's interactions into the equivalent user interactions based at least in part on a configuration of the second user interface of the application at the second user device 415-*b*. In some examples, the configuration of the second user interface of the application (i.e., the guided application) at the second user device 415-*b* may include a display size on which the second user interface of the application is displayed, a language (e.g., English, German, Mandarin, etc.) used by the second interface of the application, a privilege level of the second user at the second interface of the application, or a user device 415 type, for example.

In some examples, one of the first extension 420 or the second extension 425 may convert, based at least on the configuration of the second user interface of the application at the second user device 415-*b*, the user's interactions into equivalent user interactions with the guided application at the second user device 415-*b*. In examples where the first extension 420 converts the user's interactions into equivalent user interactions with the guided application at the second user device 415-*b*, the first extension 420 may transmit the resulting equivalent user interactions to the second extension 425 via the extension connection 440.

In some cases, one of the first extension 420 or the second extension 425 may convert the non-user actions into equivalent actions of the guided application at the second user device 415-*b*. The first extension 420 or the second extension 425 may convert the non-user actions into the equivalent actions of the guided application at the second user device 415-*b* based at least in part on a configuration of the second user interface of the application at the second user device 415-*b*. In some examples, the configuration of the second user interface of the application (i.e., the guided application) at the second user device 415-*b* may include a display size on which the second user interface of the application is displayed, a language (e.g., English, German, Mandarin, etc.) used by the second interface of the application, a user device 415 type, a privilege level of the second user using the guided application or any other quantitative or qualitative object or value associated with client-side validation or security of the system 400.

Figure 5:
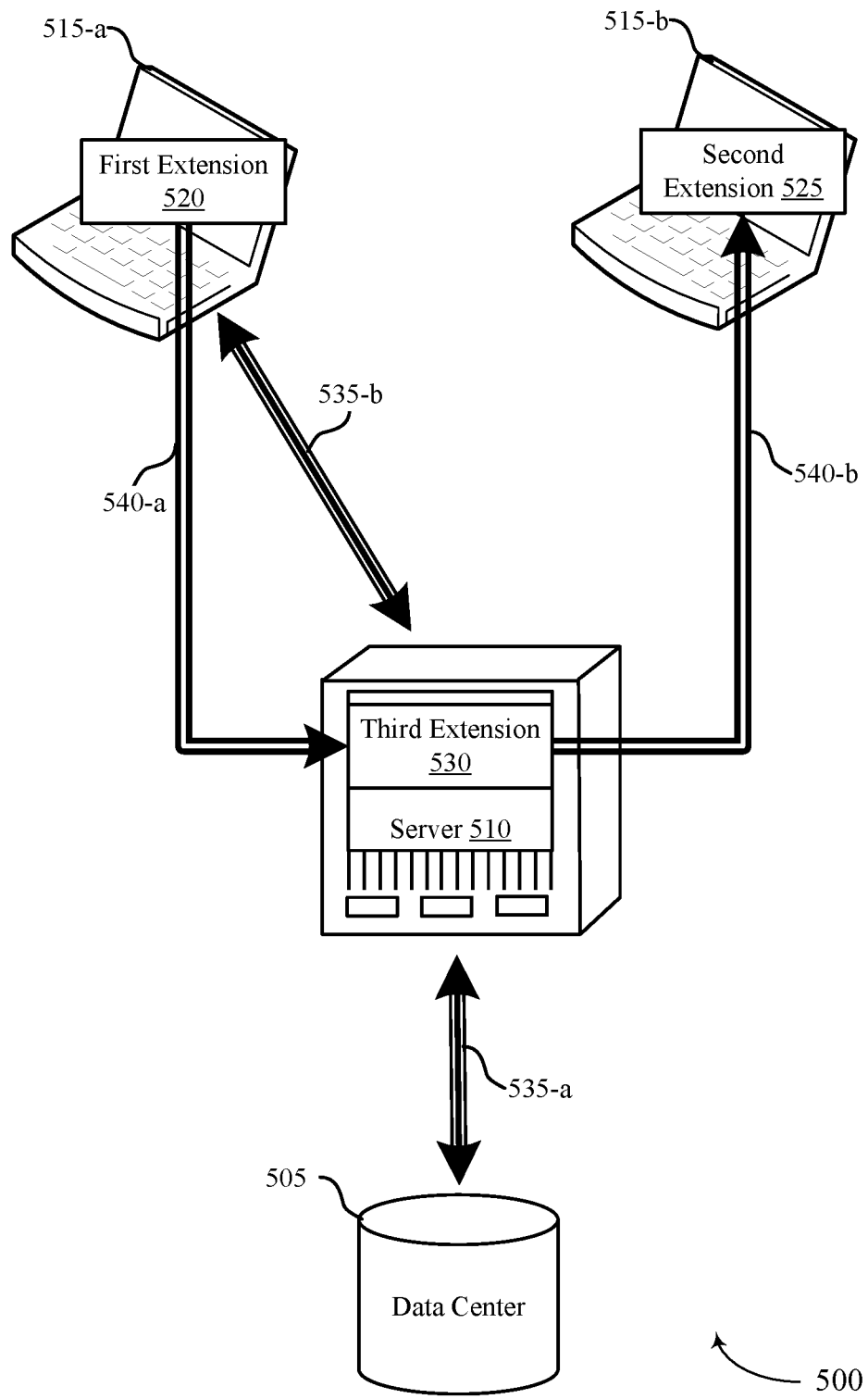
FIG. 5 illustrates an example of a system that supports real-time equivalent user interaction generation in accordance with aspects of the present disclosure.

FIG. 5 illustrates an example of a system 500 that supports real-time equivalent user interaction generation in accordance with aspects of the present disclosure. More specifically, the system 500 is an example of an application mirroring system that supports real-time equivalent user interaction generation in accordance with aspects of the present disclosure. The system 500, which may be an example of a system for data processing, includes a data center 505, a server 510, and two user devices 515. The system 500 may implement aspects of the systems 100, 200, 300, or 400 as described with reference to FIGS. 1-4 to support real-time equivalent user interaction generation to facilitate guiding through, training with, or presentation of an application or information associated with the application using data stored or processed by a cloud platform, for example, the cloud platform 115. For example, the server 510 may be an example of a single server, a server cluster, a database server, a cloud-based server, a virtual machine, a container, or any other device or system that supports data processing. The server 510 may be a central server that stores at least a portion of the data relevant to the system 500 and may exchange certain data with the user devices 515 via the server connections 535. Additionally, the user devices 515 may be examples of cloud clients 105 or contacts 110, and the data center 505 may implement aspects of one or more of the data center 120 or cloud platform 115 as described with reference to FIG. 1, for example.

Each of the user devices 515 includes an application that is presented to a respective user via a user interface of the application on a display of each of the user devices 515. In this example, a first user may interact with the application, which may be an example a training application or any other type of application, via a user interface of the first user device 515-*a*. A second user may interact with the application via a user interface of the second user device 515-*b*. The application at the first user device 515-*a* may be an example of a driver application, and the application at the second user device 515-*b* may be an example of a listener application. The driver application at the first user device 515-*a* may serve as a guide, or trainer, application and the listener application at the second user device 515-*b* may serve as a guided, or trainee, application.

The system 500 further includes a first extension 520 of the guide application at the first user device 515-*a*, a second extension 525 of the guided application at the second user device 515-*b*, a third extension 530 of the application located at the server 510, server connections 535 extending between the server 510 and the data center 505 and between the server 510 and the first user device 515-*a*, and extension connections 540 extending between the first extension 520 and the third extension 530 and between the third extension 530 and the second extension 525. Each of the first extension 520, the second extension 525, and the third extension 530 may be one or more of an auxiliary executable file (e.g., a dynamic link library (DLL)), a supplementary routine configured to add capabilities to a respective one of the guide application or the guided application, or a supplementary format that adds options in a data set.

The server connections 535 and the extension connections 540 may be examples of communication connections configured for transmitting electromagnetic energy between the respective components of the system 500. In some examples, one or more of the server connections 535 or the extension connections 540 may be wireless connections. In some examples, one or more of the server connections 535 or the extension connections 540 may be non-wireless connections (e.g., a land-line, a fiber optic connection, etc.).

The guide application and the first extension 520 of the guide application at the first user device 515-*a* may communicate with the server 510 via the server connection 535-*b* to communicate data related to one or more of the first extension 520, the guide application, or the first user device 515-*a*. The guided application and the second extension 525 may communicate solely with the third extension 530 via the extension connection 540-*b*. In this example, the guided application at the second user device 515-*b* "mirrors" the guide application at the first user device 515-*a*. The guided application and the second extension 525 may receive all data associated with the guide application at the first user device 515-*a* and the first extension 520 of the guide application from the third extension 530 without interacting with the server 510.

The guide application at the first user device 515-*a* may receive one or more user's interactions from the first user. The first extension 520 may capture all application-side actions, including the received one or more user's interactions and non-user actions (e.g., client-side validation of input data, additional client-side validations, application security checks, etc.) and may transmit both of the input user's interactions and the non-user actions directly to the third extension 530 via the extension connection 540-*a*. In some cases, the input user's interactions and the non-user actions may be sent to the server 510 via the extension connection 540-*a* and then may be received by the third extension 530.

The third extension 530 may receive the user's interactions and non-user actions and may transmit both of the user's interactions and the non-user actions to the second extension 525 of the guided application at the second user device 515-*b* via the extension connection 540-*b*. In some examples, the third extension 530 may transmit the user's interactions and the non-user actions directly to the guided application at the second user device 515-*b*, and the guided application at the second user device 515-*b* may deliver the user's interactions and the non-user actions to the second extension 525. In other examples, the third extension 530 may transmit some or all of the user's interactions and the non-user actions to one of the guided application at the second user device 515-*b* or the second extension 525 via the server connection 535-*c*.

The third extension 530 may convert the user's interactions into equivalent user interactions with the second interface of the application (i.e., the guided application) at the second user device 515-*b*. The third extension 530 may convert the user's interactions into the equivalent user interactions based at least in part on a configuration of the second user interface of the application at the second user device 515-*b*. In some examples, the configuration of the second user interface of the application (i.e., the guided application) at the second user device 515-*b* may include a display size on which the second user interface of the application is displayed, a language (e.g., English, German, Mandarin, etc.) used by the second interface of the application, a privilege level of the second user at the second interface of the application, or a user device 515 type, for example.

In some examples, one of the first extension 520 or the second extension 525 may convert, based at least on the configuration of the second user interface of the application at the second user device 515-*b*, the user's interactions into equivalent user interactions with the guided application at the second user device 515-*b*. In examples where the first extension 520 converts the user's interactions into equivalent user interactions with the guided application at the second user device 515-*b*, the first extension 520 may transmit the resulting equivalent user interactions to the second extension 525 via the extension connections 540 and the third extension 330.

In some cases, the third extension 530 may convert the non-user actions into equivalent actions of the guided application at the second user device 515-*b*. The third extension 530 may convert the non-user actions into the equivalent actions of the guided application at the second user device 515-*b* based at least in part on a configuration of the second user interface of the application at the second user device 515-*b*. In some examples, the configuration of the second user interface of the application (i.e., the guided application) at the second user device 515-*b* may include a display size on which the second user interface of the application is displayed, a language (e.g., English, German, Mandarin, etc.) used by the second interface of the application, a user device 515 type, a privilege level of the second user using the guided application or any other quantitative or qualitative object or value associated with client-side validation or security of the system 500. In some examples, one of the first extension 520 or the second extension 525 may convert, based at least on the configuration of the second user interface of the application at the second user device 515-*b*, the non-user actions into equivalent actions of the guided application at the second user device 515-*b*.

Figure 6:
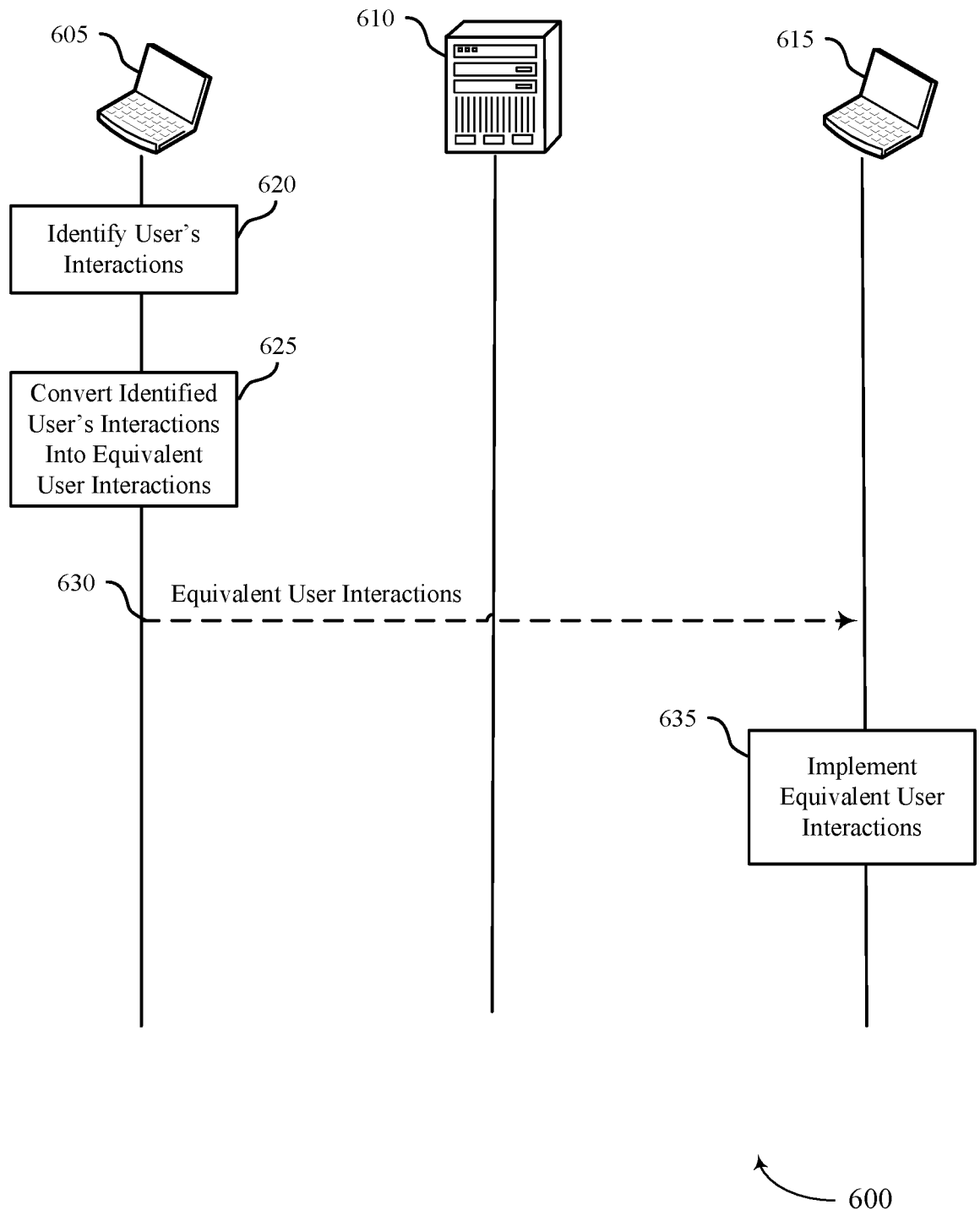
FIG. 6 illustrates an example of a process flow that supports real-time equivalent user interaction generation in accordance with aspects of the present disclosure.

FIG. 6 illustrates an example of a process flow 600 that supports real-time equivalent user interaction generation in accordance with aspects of the present disclosure. The process flow 600 includes a first user device 605, a server 610, and a second user device 615. These may be examples of the corresponding devices described with reference to FIGS. 1 through 5. Alternative examples of the following may be implemented, where some steps are performed in a different order than described, or not performed at all. In some cases, steps may include additional features not mentioned below, or further steps may be added.

At 620, a user's interactions with a first user interface of an application at the first user device 605 may be identified. In some examples, the user's interactions with the first user interface of the application may be identified by a first extension of the application at the first user device 605. In some cases, the first extension may be one of an extension injected into a browser by a server, such as the server 610, or a browser extension. In additional examples, actions of the application at the first user device 605 may be identified. Such actions may include one or both of application security checks or client-side validations, for example.

At 625, the identified user's interactions with the first user interface of the application may be converted into equivalent user interactions with a second user interface of the application. The identified user's interactions may be converted into the equivalent user interactions at the second interface based at least in part on a configuration of the second user interface of the application at the second user device 615.

At 630, the equivalent user interactions may be transmitted from the application at the first user device 605 to the application at the second user device 615. In some cases, the equivalent user interactions may be transmitted from the first extension of the application at the first user device 605 to a second extension of the application at the second user device 615. In some cases, the identified user's interactions with the first user interface of the application at the first user device 605 may transmitted from the first extension of the application at the first user device 605 to the second extension of the application at the second user device 615. In some cases, one of the equivalent user interactions or the identified user's interactions may be transmitted from the first extension of the application at the first user device 605 to the second extension of the application at the second user device 615 via the server 610.

In some cases, a direct communication connection may be established between the first user device 605 and the second user device 615, and one of the identified user's interactions with the first user interface of the application or the equivalent user interactions with the second user interface of the application may be transmitted via the direct communication connection. In some such cases, the direct communication connection between the first user device 605 and the second user device 615 may be established by one of manually configuring parameters of the direct communication connection or dynamically discovering the parameters of the direct communication connection between the first user device 605 and the second user device 615. In some cases, the direct communication connection between the first user device 605 and the second user device 615 may be established via the server 610. In some such cases, the server 610 may provide the second user device 615 with data. Such data may include data associated with one or more the first user device 605, the second user device 615, the application, actions of the application at the first user device 605, the user's interactions with the first user interface of the application at the first user device 605, or the equivalent user interactions with the second user interface of the application at the second user device 615.

In some cases, the identified actions of the application at the first user device 605 may be transmitted to the server 210. In some cases, the application at the first user device 605 may transmit the identified actions to the server 210. In other cases, the first extension of the application at the first device may transmit the identified actions to the server 210. In some cases, the identified actions of the application at the first user device 605 may be converted into equivalent actions of the application at the second user device 615 at one of the first user device 605, the server 610, or the second user device 615. In some cases, the identified actions of the application at the first user device 605 may be converted into equivalent actions of the application at the second user device 615 by one of the first extension, the second extension, or a third extension of the application at the server 610.

At 635, the equivalent user interactions with the second user interface of the application at the second user device 615 may be implemented. In some cases, the configuration of the second user interface of the application at the second user device 615 may be different from the configuration of the first user interface of the application at the first user device 605. In such cases, the equivalent user interactions with the second user interface may be different from the identified user's interactions with the first user interface. In some additional cases, the converted equivalent actions may be performed, on behalf of the application at the second user device 615. In such cases, the converted equivalent actions may be performed by one of the application at the second user device 615, or the extension of the application at the second user device 615.

Figure 7:
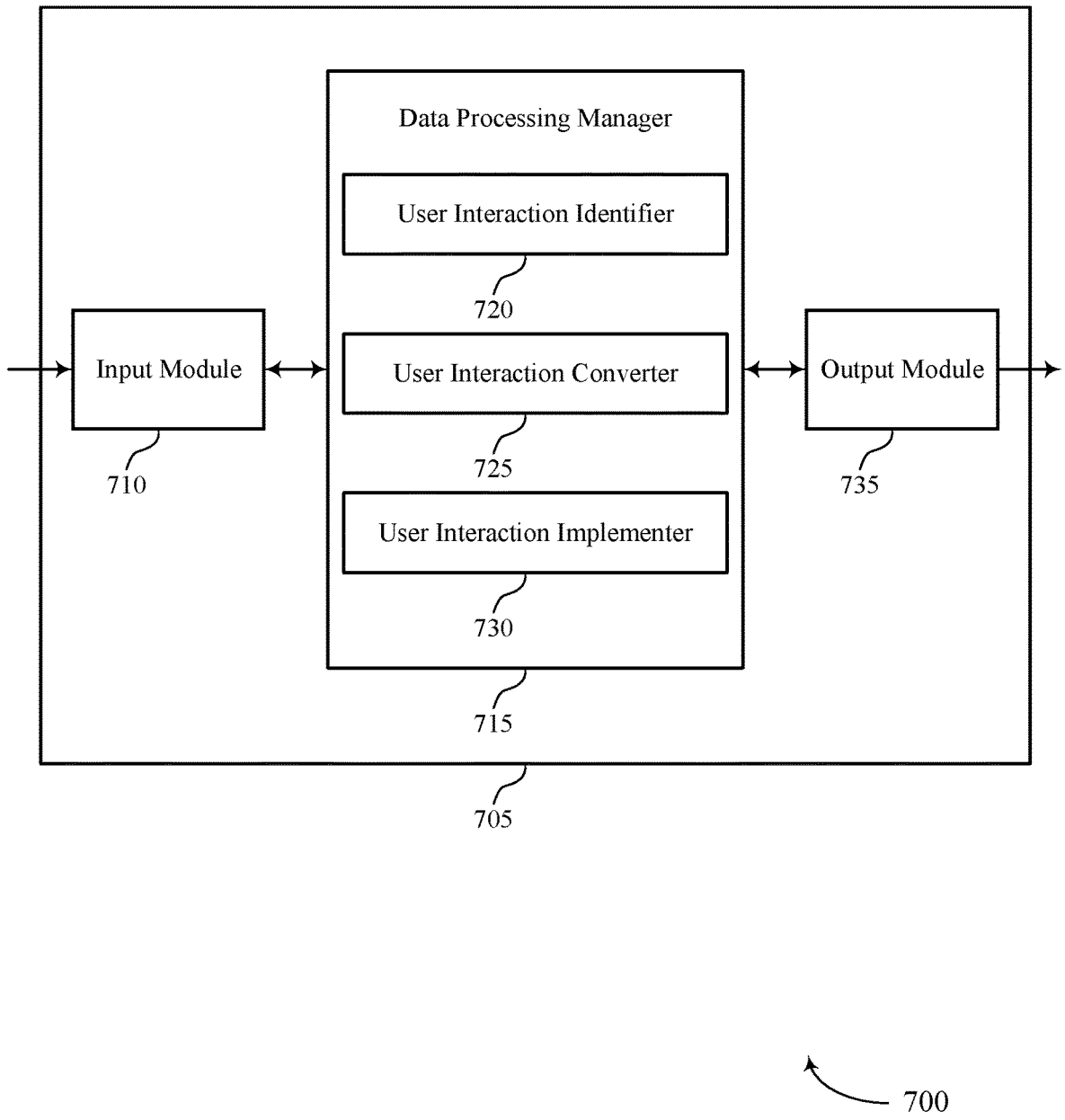
FIG. 7 shows a block diagram of an apparatus that supports real-time equivalent user interaction generation in accordance with aspects of the present disclosure.

FIG. 7 shows a block diagram 700 of an apparatus 705 that supports real-time equivalent user interaction generation in accordance with aspects of the present disclosure. The apparatus 705 may include an input module 710, a data processing manager 715, and an output module 735. The apparatus 705 may also include a processor. Each of these components may be in communication with one another (e.g., via one or more buses). In some cases, the apparatus 705 may be an example of a user terminal, a database server, or a system containing multiple computing devices.

The input module 710 may manage input signals for the apparatus 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the apparatus 705 for processing. For example, the input module 710 may transmit input signals to the data processing manager 715 to support data retention handling for data object stores. In some cases, the input module 710 may be a component of an input/output (I/O) controller 915 as described with reference to FIG. 9.

The data processing manager 715 may include a user interaction identifier 720, a user interaction converter 725, and a user interaction implementer 730. The data processing manager 715 may be an example of aspects of the data processing manager 805 or 910 described with reference to FIGS. 8 and 9.

The data processing manager 715 and/or at least some of its various sub-components may be implemented in hardware, software executed by a processor, firmware, or any combination thereof. If implemented in software executed by a processor, the functions of the data processing manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data processing manager 715 and/or at least some of its various sub-components may be physically located at various positions, including being distributed such that portions of functions are implemented at different physical locations by one or more physical devices. In some examples, the data processing manager 715 and/or at least some of its various sub-components may be a separate and distinct component in accordance with various aspects of the present disclosure. In other examples, the data processing manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The user interaction identifier 720 may identify a user's interactions with a first user interface of a set of user interfaces of an application at a first user device of a set of user devices.

The user interaction converter 725 may convert the identified user's interactions with the first user interface of the application into equivalent user interactions with a second user interface of the set of user interfaces of the application based on a configuration of the second user interface of the application at a second user device of the set of user devices.

The user interaction implementer 730 may implement the equivalent user interactions with the second user interface of the application at the second user device, where the configuration of the second user interface of the application at the second user device and a configuration of the first user interface of the application at the first user device are different.

The output module 735 may manage output signals for the apparatus 705. For example, the output module 735 may receive signals from other components of the apparatus 705, such as the data processing manager 715, and may transmit these signals to other components or devices. In some specific examples, the output module 735 may transmit output signals for display in a user interface, for storage in a database or data store, for further processing at a server or server cluster, or for any other processes at any number of devices or systems. In some cases, the output module 735 may be a component of an I/O controller 915 as described with reference to FIG. 9.

Figure 8:
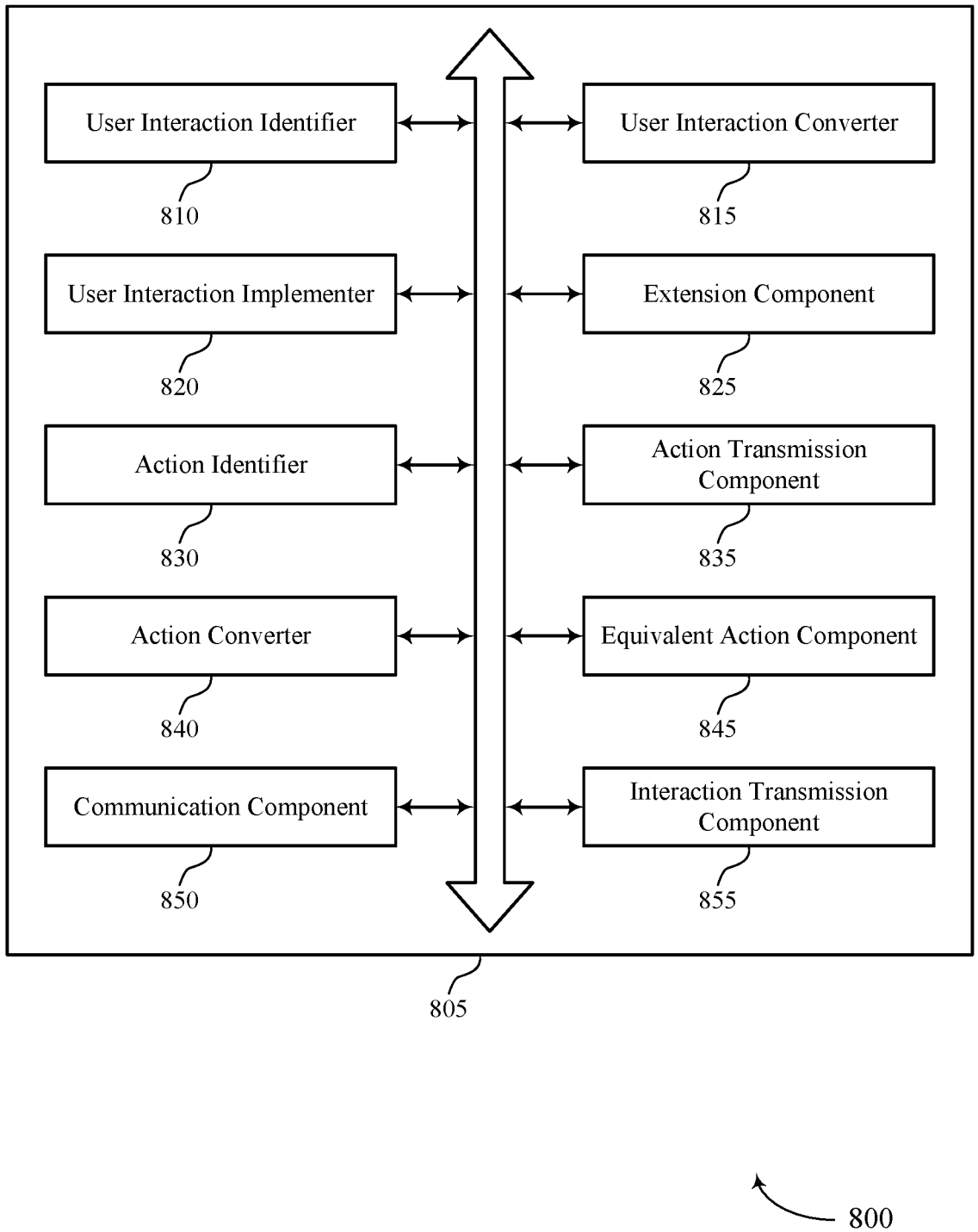
FIG. 8 shows a block diagram of a data processing manager that supports real-time equivalent user interaction generation in accordance with aspects of the present disclosure.

FIG. 8 shows a block diagram 800 of a data processing manager 805 that supports real-time equivalent user interaction generation in accordance with aspects of the present disclosure. The data processing manager 805 may be an example of aspects of a data processing manager 715 or a data processing manager 910 described herein. The data processing manager 805 may include a user interaction identifier 810, a user interaction converter 815, a user interaction implementer 820, an extension component 825, an action identifier 830, an action transmission component 835, an action converter 840, an equivalent action component 845, a communication component 850, and an interaction transmission component 855. Each of these modules may communicate, directly or indirectly, with one another (e.g., via one or more buses).

The user interaction identifier 810 may identify a user's interactions with a first user interface of a set of user interfaces of an application at a first user device of a set of user devices.

The user interaction converter 815 may convert the identified user's interactions with the first user interface of the application into equivalent user interactions with a second user interface of the set of user interfaces of the application based on a configuration of the second user interface of the application at a second user device of the set of user devices.

The user interaction implementer 820 may implement the equivalent user interactions with the second user interface of the application at the second user device, where the configuration of the second user interface of the application at the second user device and a configuration of the first user interface of the application at the first user device are different.

The extension component 825 may identify the user's interactions with the first user interface of the application by identifying, by a first extension, the user's interactions with the first user interface of the application, and where implementing the equivalent user interactions with the second user interface of the application includes implementing, by a second extension, the equivalent user interactions with the second user interface of the application.

The action identifier 830 may identify actions of the application at the first user device, where the actions of the application include one or both of application security checks or client-side validations.

The action transmission component 835 may transmit the identified actions of the application at the first user device to a server in communication with the first user device and the second user device.

The action converter 840 may convert the identified actions of the application at the first user device into equivalent actions of the application at the second user device.

The equivalent action component 845 may perform, on behalf of the application at the second user device, the converted equivalent actions of the application at the second user device.

The communication component 850 may establish a direct communication connection between the first user device and the second user device.

The interaction transmission component 855 may transmit, from the first user device to the second user device, one of the identified user's interactions with the first user interface of the application or the equivalent user interactions with the second user interface of the application.

Figure 9:
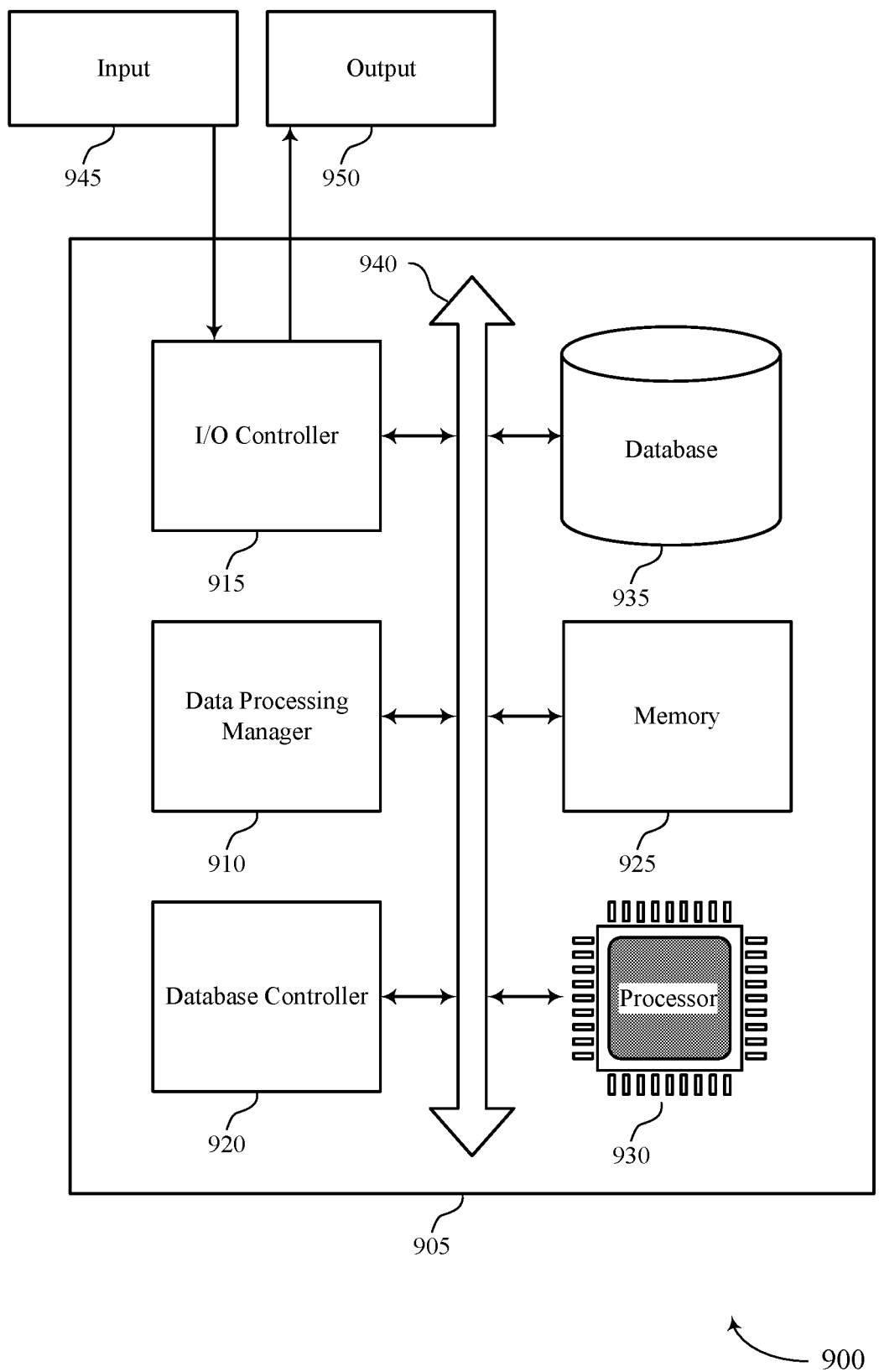
FIG. 9 shows a diagram of a system including a device that supports real-time equivalent user interaction generation in accordance with aspects of the present disclosure.

FIG. 9 shows a diagram of a system 900 including a device 905 that supports real-time equivalent user interaction generation in accordance with aspects of the present disclosure. The device 905 may be an example of or include the components of an application server or an apparatus 705 as described herein. The device 905 may include components for bi-directional data communications including components for transmitting and receiving communications, including a data processing manager 910, an I/O controller 915, a database controller 920, memory 925, a processor 930, and a database 935. These components may be in electronic communication via one or more buses (e.g., bus 940).

The data processing manager 910 may be an example of a data processing manager 715 or 805 as described herein. For example, the data processing manager 910 may perform any of the methods or processes described above with reference to FIGS. 7 and 8. In some cases, the data processing manager 910 may be implemented in hardware, software executed by a processor, firmware, or any combination thereof.

The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor to perform various functions described herein. In some cases, the memory 925 may contain, among other things, a basic input/output system (BIOS) which may control basic hardware or software operation such as the interaction with peripheral components or devices.

The processor 930 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting real-time equivalent user interaction generation).

Figure 10:
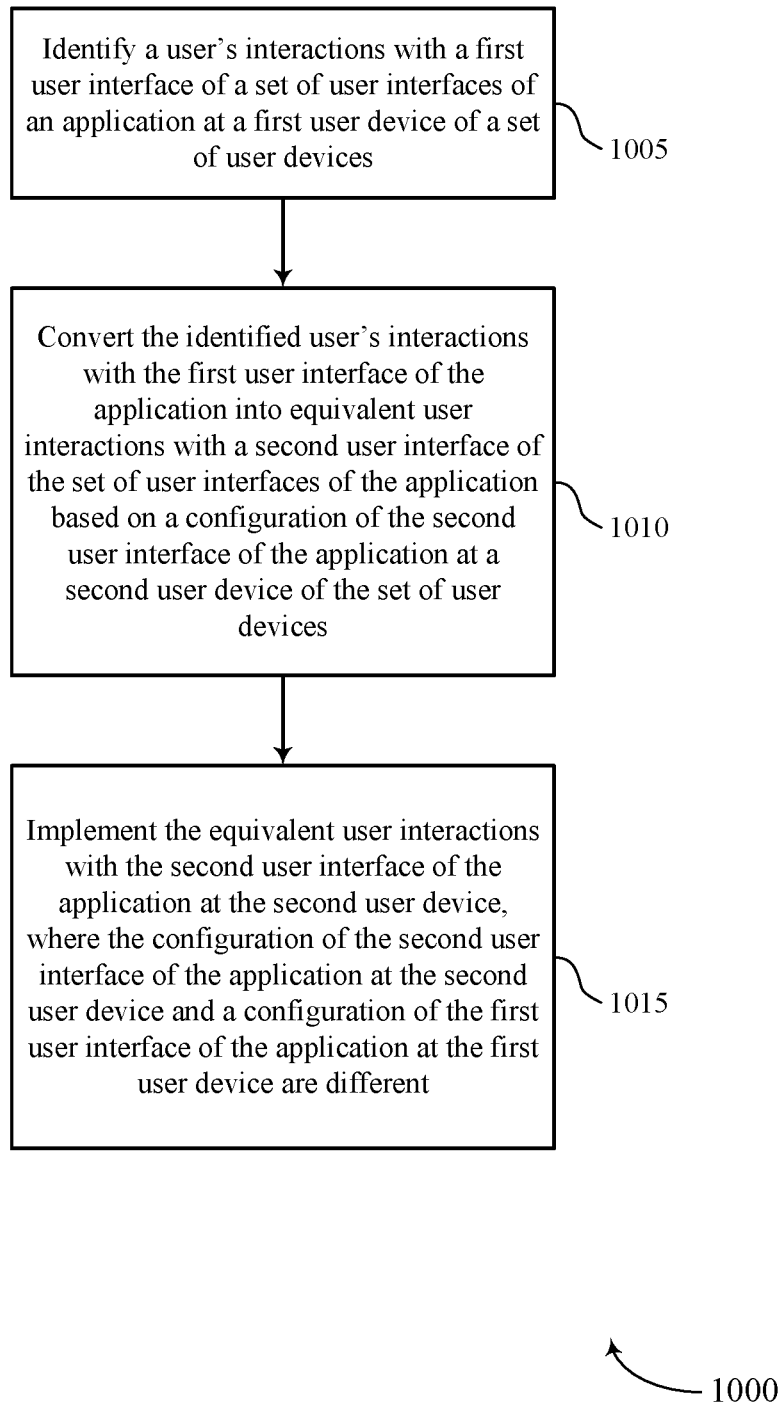
FIGS. 10 through 13 show flowcharts illustrating methods that support real-time equivalent user interaction generation in accordance with aspects of the present disclosure.

FIG. 10 shows a flowchart illustrating a method 1000 that supports real-time equivalent user interaction generation in accordance with aspects of the present disclosure. The operations of method 1000 may be implemented by an application server or its components as described herein. For example, the operations of method 1000 may be performed by a data processing manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1005, the application server may identify a user's interactions with a first user interface of a set of user interfaces of an application at a first user device of a set of user devices. The operations of 1005 may be performed according to the methods described herein. In some examples, aspects of the operations of 1005 may be performed by a user interaction identifier as described with reference to FIGS. 7 through 9.

At 1010, the application server may convert the identified user's interactions with the first user interface of the application into equivalent user interactions with a second user interface of the set of user interfaces of the application based on a configuration of the second user interface of the application at a second user device of the set of user devices. The operations of 1010 may be performed according to the methods described herein. In some examples, aspects of the operations of 1010 may be performed by a user interaction converter as described with reference to FIGS. 7 through 9.

At 1015, the application server may implement the equivalent user interactions with the second user interface of the application at the second user device, where the configuration of the second user interface of the application at the second user device and a configuration of the first user interface of the application at the first user device are different. The operations of 1015 may be performed according to the methods described herein. In some examples, aspects of the operations of 1015 may be performed by a user interaction implementer as described with reference to FIGS. 7 through 9.

Figure 11:
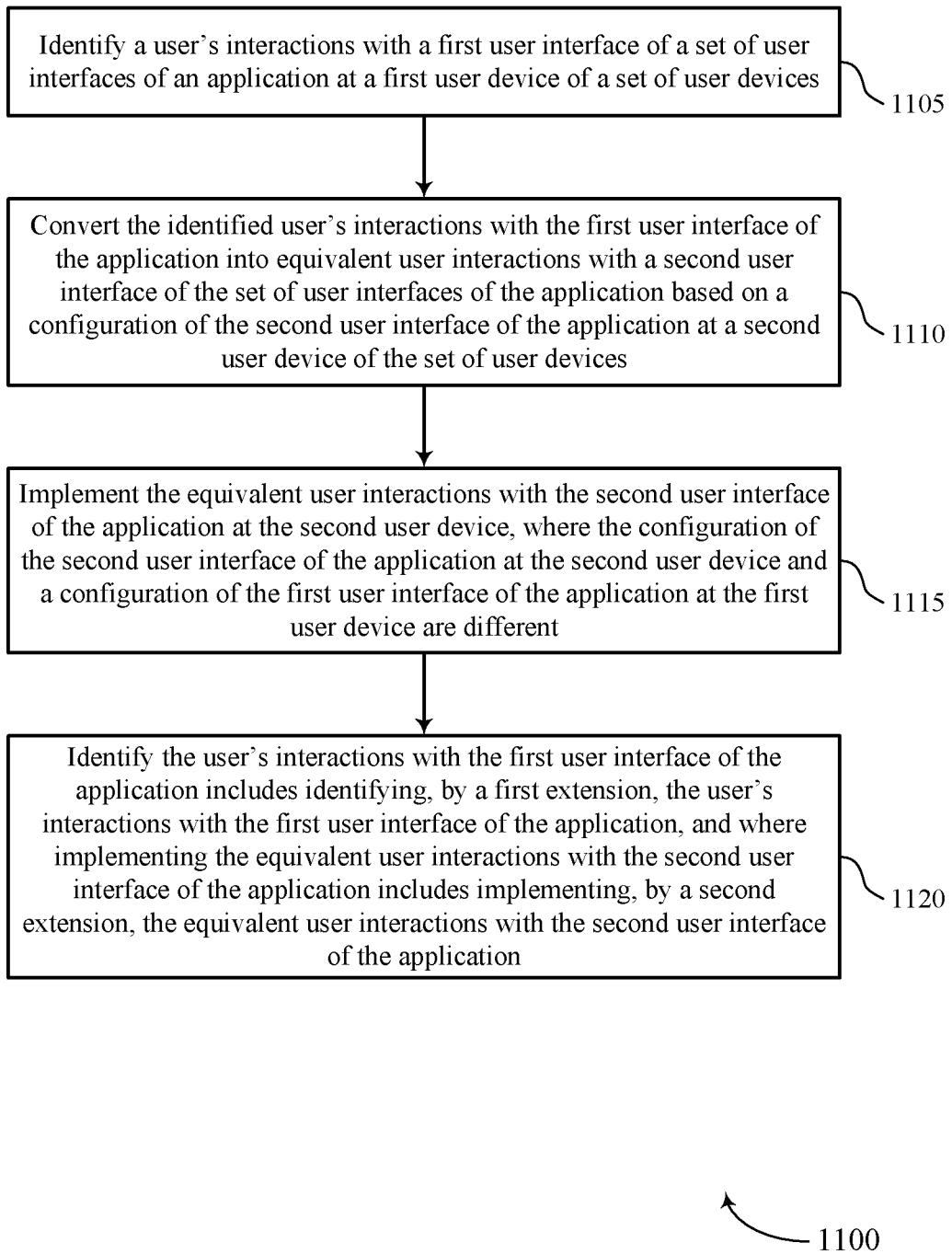

FIG. 11 shows a flowchart illustrating a method 1100 that supports real-time equivalent user interaction generation in accordance with aspects of the present disclosure. The operations of method 1100 may be implemented by an application server or its components as described herein. For example, the operations of method 1100 may be performed by a data processing manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1105, the application server may identify a user's interactions with a first user interface of a set of user interfaces of an application at a first user device of a set of user devices. The operations of 1105 may be performed according to the methods described herein. In some examples, aspects of the operations of 1105 may be performed by a user interaction identifier as described with reference to FIGS. 7 through 9.

At 1110, the application server may convert the identified user's interactions with the first user interface of the application into equivalent user interactions with a second user interface of the set of user interfaces of the application based on a configuration of the second user interface of the application at a second user device of the set of user devices. The operations of 1110 may be performed according to the methods described herein. In some examples, aspects of the operations of 1110 may be performed by a user interaction converter as described with reference to FIGS. 7 through 9.

At 1115, the application server may implement the equivalent user interactions with the second user interface of the application at the second user device, where the configuration of the second user interface of the application at the second user device and a configuration of the first user interface of the application at the first user device are different. The operations of 1115 may be performed according to the methods described herein. In some examples, aspects of the operations of 1115 may be performed by a user interaction implementer as described with reference to FIGS. 7 through 9.

At 1120, the application server may identify the user's interactions with the first user interface of the application by identifying, by a first extension, the user's interactions with the first user interface of the application, and where implementing the equivalent user interactions with the second user interface of the application includes implementing, by a second extension, the equivalent user interactions with the second user interface of the application. The operations of 1120 may be performed according to the methods described herein. In some examples, aspects of the operations of 1120 may be performed by an extension component as described with reference to FIGS. 7 through 9.

Figure 12:
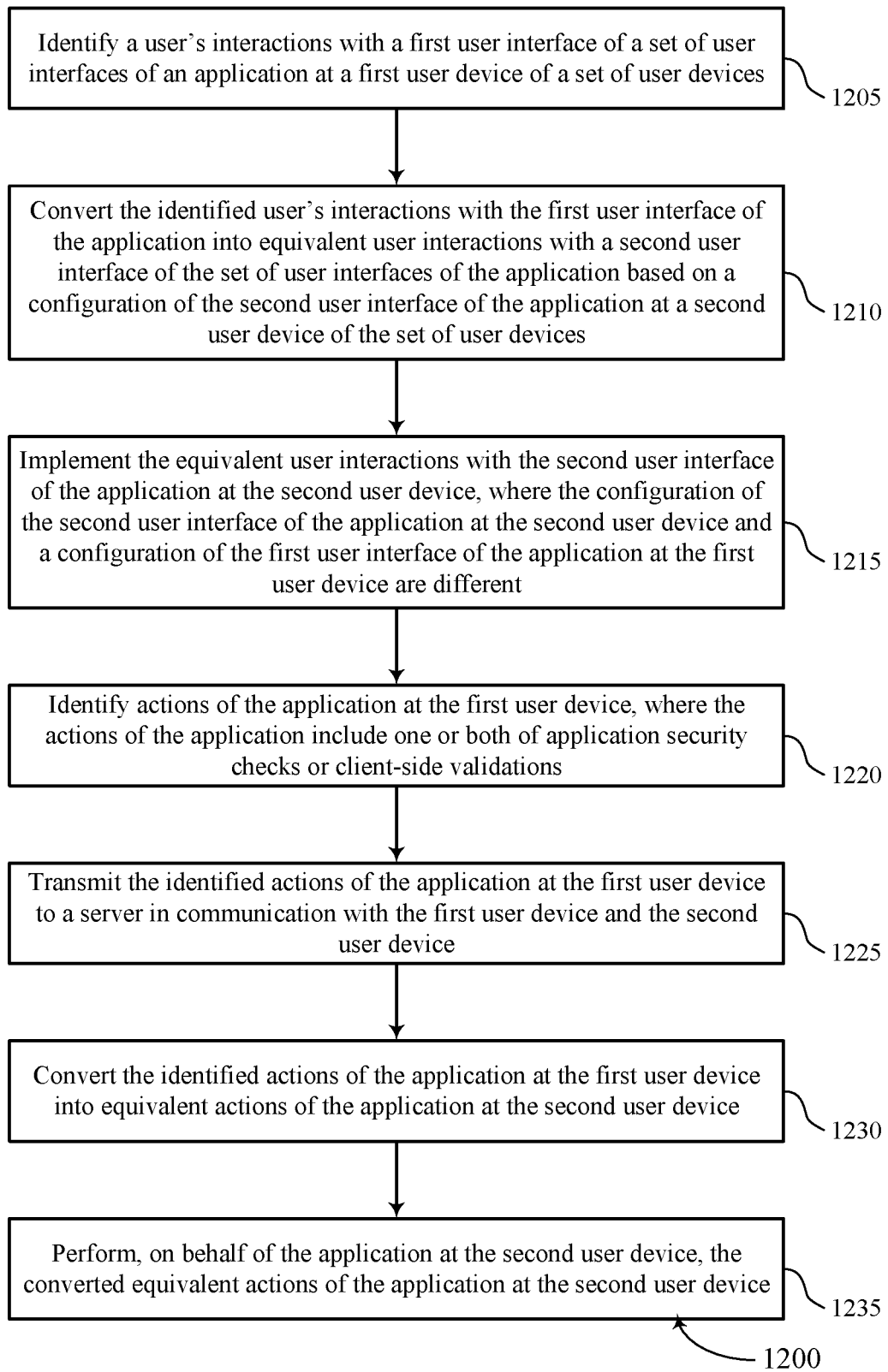

FIG. 12 shows a flowchart illustrating a method 1200 that supports real-time equivalent user interaction generation in accordance with aspects of the present disclosure. The operations of method 1200 may be implemented by an application server or its components as described herein. For example, the operations of method 1200 may be performed by a data processing manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1205, the application server may identify a user's interactions with a first user interface of a set of user interfaces of an application at a first user device of a set of user devices. The operations of 1205 may be performed according to the methods described herein. In some examples, aspects of the operations of 1205 may be performed by a user interaction identifier as described with reference to FIGS. 7 through 9.

At 1210, the application server may convert the identified user's interactions with the first user interface of the application into equivalent user interactions with a second user interface of the set of user interfaces of the application based on a configuration of the second user interface of the application at a second user device of the set of user devices. The operations of 1210 may be performed according to the methods described herein. In some examples, aspects of the operations of 1210 may be performed by a user interaction converter as described with reference to FIGS. 7 through 9.

At 1215, the application server may implement the equivalent user interactions with the second user interface of the application at the second user device, where the configuration of the second user interface of the application at the second user device and a configuration of the first user interface of the application at the first user device are different. The operations of 1215 may be performed according to the methods described herein. In some examples, aspects of the operations of 1215 may be performed by a user interaction implementer as described with reference to FIGS. 7 through 9.

At 1220, the application server may identify actions of the application at the first user device, where the actions of the application include one or both of application security checks or client-side validations. The operations of 1220 may be performed according to the methods described herein. In some examples, aspects of the operations of 1220 may be performed by an action identifier as described with reference to FIGS. 7 through 9.

At 1225, the application server may transmit the identified actions of the application at the first user device to a server in communication with the first user device and the second user device. The operations of 1225 may be performed according to the methods described herein. In some examples, aspects of the operations of 1225 may be performed by an action transmission component as described with reference to FIGS. 7 through 9.

At 1230, the application server may convert the identified actions of the application at the first user device into equivalent actions of the application at the second user device. The operations of 1230 may be performed according to the methods described herein. In some examples, aspects of the operations of 1230 may be performed by an action converter as described with reference to FIGS. 7 through 9.

At 1235, the application server may perform, on behalf of the application at the second user device, the converted equivalent actions of the application at the second user device. The operations of 1235 may be performed according to the methods described herein. In some examples, aspects of the operations of 1235 may be performed by an equivalent action component as described with reference to FIGS. 7 through 9.

Figure 13:
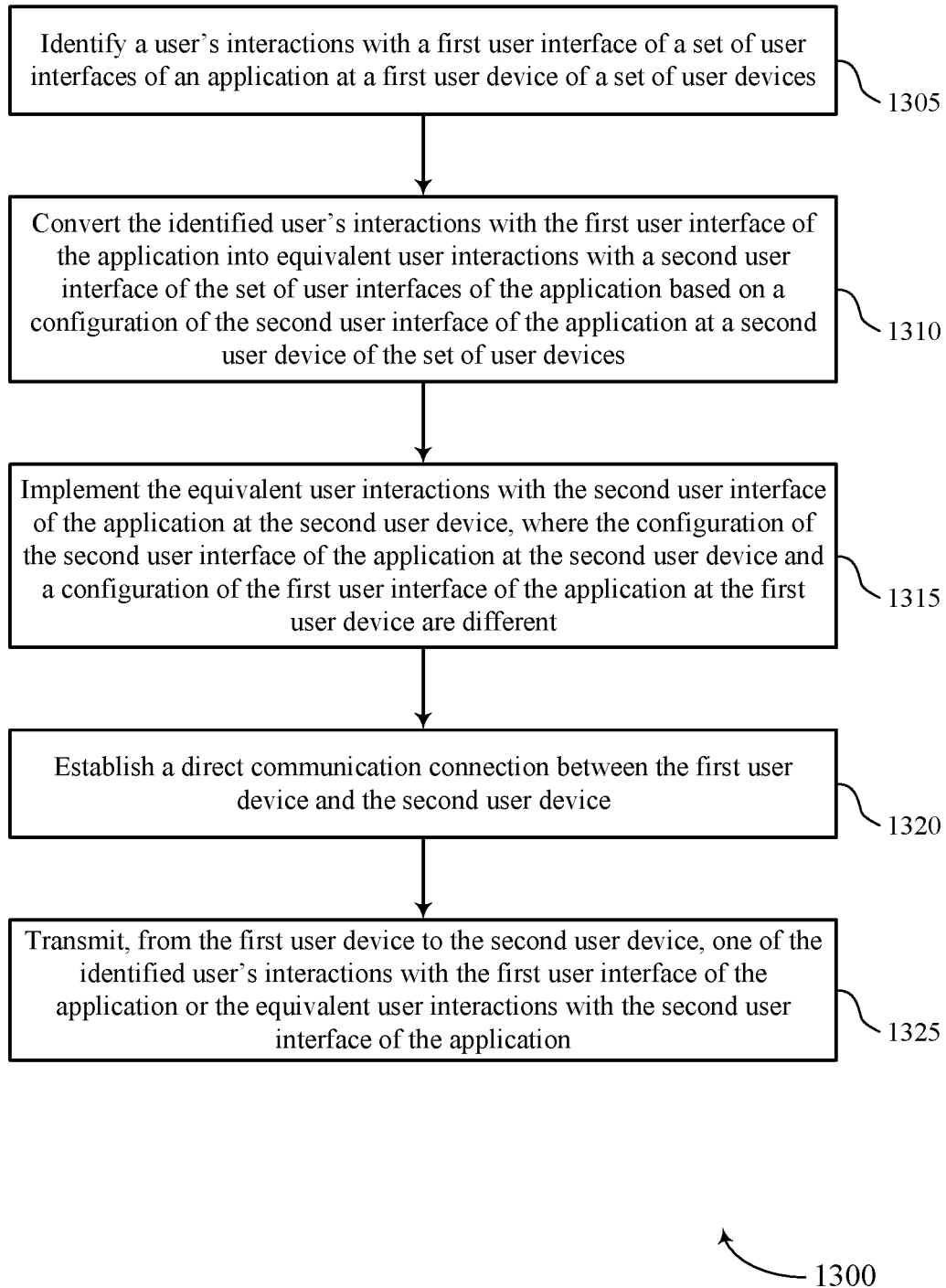

FIG. 13 shows a flowchart illustrating a method 1300 that supports real-time equivalent user interaction generation in accordance with aspects of the present disclosure. The operations of method 1300 may be implemented by an application server or its components as described herein. For example, the operations of method 1300 may be performed by a data processing manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1305, the application server may identify a user's interactions with a first user interface of a set of user interfaces of an application at a first user device of a set of user devices. The operations of 1305 may be performed according to the methods described herein. In some examples, aspects of the operations of 1305 may be performed by a user interaction identifier as described with reference to FIGS. 7 through 9.

At 1310, the application server may convert the identified user's interactions with the first user interface of the application into equivalent user interactions with a second user interface of the set of user interfaces of the application based on a configuration of the second user interface of the application at a second user device of the set of user devices. The operations of 1310 may be performed according to the methods described herein. In some examples, aspects of the operations of 1310 may be performed by a user interaction converter as described with reference to FIGS. 7 through 9.

At 1315, the application server may implement the equivalent user interactions with the second user interface of the application at the second user device, where the configuration of the second user interface of the application at the second user device and a configuration of the first user interface of the application at the first user device are different. The operations of 1315 may be performed according to the methods described herein. In some examples, aspects of the operations of 1315 may be performed by a user interaction implementer as described with reference to FIGS. 7 through 9.

At 1320, the application server may establish a direct communication connection between the first user device and the second user device. The operations of 1320 may be performed according to the methods described herein. In some examples, aspects of the operations of 1320 may be performed by a communication component as described with reference to FIGS. 7 through 9.

At 1325, the application server may transmit, from the first user device to the second user device, one of the identified user's interactions with the first user interface of the application or the equivalent user interactions with the second user interface of the application. The operations of 1325 may be performed according to the methods described herein. In some examples, aspects of the operations of 1325 may be performed by an interaction transmission component as described with reference to FIGS. 7 through 9.

A method of data processing is described. The method may include identifying a user's interactions with a first user interface of a set of user interfaces of an application at a first user device of a set of user devices, converting the identified user's interactions with the first user interface of the application into equivalent user interactions with a second user interface of the set of user interfaces of the application based on a configuration of the second user interface of the application at a second user device of the set of user devices, and implementing the equivalent user interactions with the second user interface of the application at the second user device, where the configuration of the second user interface of the application at the second user device and a configuration of the first user interface of the application at the first user device are different.

An apparatus for data processing is described. The apparatus may include a processor, memory coupled with the processor, and instructions stored in the memory. The instructions may be executable by the processor to cause the apparatus to identify a user's interactions with a first user interface of a set of user interfaces of an application at a first user device of a set of user devices, convert the identified user's interactions with the first user interface of the application into equivalent user interactions with a second user interface of the set of user interfaces of the application based on a configuration of the second user interface of the application at a second user device of the set of user devices, and implement the equivalent user interactions with the second user interface of the application at the second user device, where the configuration of the second user interface of the application at the second user device and a configuration of the first user interface of the application at the first user device are different.

Another apparatus for data processing is described. The apparatus may include means for identifying a user's interactions with a first user interface of a set of user interfaces of an application at a first user device of a set of user devices, converting the identified user's interactions with the first user interface of the application into equivalent user interactions with a second user interface of the set of user interfaces of the application based on a configuration of the second user interface of the application at a second user device of the set of user devices, and implementing the equivalent user interactions with the second user interface of the application at the second user device, where the configuration of the second user interface of the application at the second user device and a configuration of the first user interface of the application at the first user device are different.

A non-transitory computer-readable medium storing code for data processing is described. The code may include instructions executable by a processor to identify a user's interactions with a first user interface of a set of user interfaces of an application at a first user device of a set of user devices, convert the identified user's interactions with the first user interface of the application into equivalent user interactions with a second user interface of the set of user interfaces of the application based on a configuration of the second user interface of the application at a second user device of the set of user devices, and implement the equivalent user interactions with the second user interface of the application at the second user device, where the configuration of the second user interface of the application at the second user device and a configuration of the first user interface of the application at the first user device are different.

Some examples of the method, apparatuses, and non-transitory computer-readable medium described herein may further include operations, features, means, or instructions for identifying the user's interactions with the first user interface of the application includes identifying, by a first extension, the user's interactions with the first user interface of the application, and where implementing the equivalent user interactions with the second user interface of the application includes implementing, by a second extension, the equivalent user interactions with the second user interface of the application.

In some examples of the method, apparatuses, and non-transitory computer-readable medium described herein, each of the first extension and the second extension includes an extension injected into a browser by a server or a browser extension.

Some examples of the method, apparatuses, and non-transitory computer-readable medium described herein may further include operations, features, means, or instructions for transmitting, from the first extension to the second extension, one of the identified user's interactions with the first user interface of the application or the equivalent user interactions with the second user interface of the application.

In some examples of the method, apparatuses, and non-transitory computer-readable medium described herein, transmitting the one of the identified user's interactions with the first user interface of the application or the equivalent user interactions with the second user interface of the application may include operations, features, means, or instructions for transmitting the one of the identified user's interactions with the first user interface of the application or the equivalent user interactions with the second user interface of the application via a server in communication with the first user device and the second user device.

Some examples of the method, apparatuses, and non-transitory computer-readable medium described herein may further include operations, features, means, or instructions for identifying actions of the application at the first user device, where the actions of the application include one or both of application security checks or client-side validations, transmitting the identified actions of the application at the first user device to a server in communication with the first user device and the second user device, converting the identified actions of the application at the first user device into equivalent actions of the application at the second user device, and performing, on behalf of the application at the second user device, the converted equivalent actions of the application at the second user device.

Some examples of the method, apparatuses, and non-transitory computer-readable medium described herein may further include operations, features, means, or instructions for establishing a direct communication connection between the first user device and the second user device, and transmitting, from the first user device to the second user device, one of the identified user's interactions with the first user interface of the application or the equivalent user interactions with the second user interface of the application.

Some examples of the method, apparatuses, and non-transitory computer-readable medium described herein may further include operations, features, means, or instructions for establishing the direct communication connection between the first user device and the second user device includes one of manually configuring parameters of the direct communication connection between the first user device and the second user device or dynamically discovering the parameters of the direct communication connection between the first user device and the second user device.

In some examples of the method, apparatuses, and non-transitory computer-readable medium described herein, establishing the direct communication connection between the first user device and the second user device may include operations, features, means, or instructions for establishing the direct communication connection between the first user device and the second user device via a server in communication with the first user device and the second user device.

In some examples of the method, apparatuses, and non-transitory computer-readable medium described herein, the data may be associated with one or more of the first user device, the second user device, the application, actions of the application at the first user device, the user's interactions with the first user interface of the application at the first user device, the identified user's interactions with the first user interface of the application at the first user device, or the equivalent user interactions with the second user interface of the application at the second user device.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
identifying, within a real-time collaborative environment supported by a cloud platform, a first set of interactions with a first user interface of an application at a first device associated with a first user, the first set of interactions resulting in an action that is specific to the first user interface;
converting, within the real-time collaborative environment supported by the cloud platform, the first set of interactions with the first user interface of the application into a second set of interactions with a second user interface of the application at a second device associated with a second user different from the first user by using a first extension to capture the first set of interactions between the first user and the first user interface and using a second extension different from the first extension to convert the first set of interactions captured by the first extension into the second set of interactions with the second user interface, wherein the second set of interactions are different from the first set of interactions and result in a functionally equivalent action that is specific to the second user interface; and
implementing, within the real-time collaborative environment supported by the cloud platform, the second set of interactions at the second user interface of the application at the second device, thereby enabling the first user to collaboratively guide the second user through the application in real-time.

2. The method of claim 1, wherein:
identifying the first set of interactions with the first user interface of the application comprises identifying, by the first extension, the first set of interactions with the first user interface of the application; and
implementing the second set of interactions with the second user interface of the application comprises implementing, by the second extension, the second set of interactions with the second user interface of the application.

3. The method of claim 2, wherein each of the first extension and the second extension comprises an extension injected into a browser by a server or a browser extension.

4. The method of claim 2, further comprising:
transmitting, from the first extension to the second extension, one of the first set of interactions with the first user interface of the application or the second set of interactions with the second user interface of the application.

5. The method of claim 4, wherein transmitting one of the first set of interactions with the first user interface of the application or the second set of interactions with the second user interface of the application comprises:
transmitting one of the first set of interactions with the first user interface of the application or the second set of interactions with the second user interface of the application via a server in communication with the first device and the second device.

6. The method of claim 1, further comprising:
identifying the first set of interactions at the first device, wherein the first set of interactions include application security checks and client-side validations;
transmitting the first set of interactions to a server in communication with the first device and the second device;
converting the first set of interactions into the second set of interactions at the second device; and
performing, on behalf of the second device, the second set of interactions at the second user interface.

7. The method of claim 1, further comprising:
establishing a direct communication connection between the first device and the second device; and
transmitting, from the first device to the second device, one of the first set of interactions with the first user interface of the application or the second set of interactions with the second user interface of the application.

8. The method of claim 7, wherein establishing the direct communication connection between the first device and the second device comprises:

manually configuring parameters of the direct communication connection between the first device and the second device or dynamically discovering the parameters of the direct communication connection between the first device and the second device.

9. The method of claim 7, wherein establishing the direct communication connection between the first device and the second device comprises:
establishing the direct communication connection between the first device and the second device via a server in communication with the first device and the second device.

10. The method of claim 9, further comprising:
transmitting data from the server to the second device, wherein the data is associated with one or more of the first device, the second device, the application, actions of the application at the first device, the first set of interactions with the first user interface of the application at the first device, or the second set of interactions with the second user interface of the application at the second device.

11. The method of claim 1, wherein the second extension converts, in real-time, one or more display options of the application from a first language associated with the first user interface to a second language associated with the second user interface using data provided by the first extension.

12. An apparatus for data processing, comprising:
a processor,
memory coupled with the processor; and
instructions stored in the memory and executable by the processor to cause the apparatus to:
identify, within a real-time collaborative environment supported by a cloud platform, a first set of interactions with a first user interface of an application at a first device associated with a first user, the first set of interactions resulting in an action that is specific to the first user interface;
convert, within the real-time collaborative environment supported by the cloud platform, the first set of interactions with the first user interface of the application into a second set of interactions with a second user interface of the application at a second device associated with a second user different from the first user by using a first extension to capture the first set of interactions between the first user and the first user interface and using a second extension different from the first extension to convert the first set of interactions captured by the first extension into the second set of interactions with the second user interface, wherein the second set of interactions are different from the first set of interactions and result in a functionally equivalent action that is specific to the second user interface; and
implement, within the real-time collaborative environment supported by the cloud platform, the second set of interactions at the second user interface of the application at the second device, thereby enabling the first user to collaboratively guide the second user through the application in real-time.

13. The apparatus of claim 12, wherein:
the instructions to identify the first set of interactions with the first user interface of the application are executable by the processor to cause the apparatus to identify, by the first extension, the first set of interactions with the first user interface of the application; and
the instructions to implement second set of interactions with the second user interface of the application are executable by the processor to cause the apparatus to implement, by the second extension, the second set of interactions with the second user interface of the application.

14. The apparatus of claim 13, wherein the instructions are further executable by the processor to cause the apparatus to:
transmit, from the first extension to the second extension, one of the first set of interactions with the first user interface of the application or the second set of interactions with the second user interface of the application.

15. The apparatus of claim 14, wherein the instructions to transmit one of the first set of interactions with the first user interface of the application or the second set of interactions with the second user interface of the application are executable by the processor to cause the apparatus to:
transmit one of the first set of interactions with the first user interface of the application or the second set of interactions with the second user interface of the application via a server in communication with the first device and the second device.

16. The apparatus of claim 12, wherein the instructions are further executable by the processor to cause the apparatus to:
identify the first set of interactions at the first device, wherein the first set of interactions include application security checks and client-side validations;
transmit the first set of interactions to a server in communication with the first device and the second device;
convert the first set of interactions into the second set of interactions at the second device; and
perform, on behalf of the second device, the second set of interactions at the second user interface.

17. The apparatus of claim 12, wherein the instructions are further executable by the processor to cause the apparatus to:
establish a direct communication connection between the first device and the second device; and
transmit, from the first device to the second device, one of the first set of interactions with the first user interface of the application or the second set of interactions with the second user interface of the application.

18. The apparatus of claim 17, wherein the instructions to establish the direct communication connection between the first device and the second device are executable by the processor to cause the apparatus to:
manually configure parameters of the direct communication connection between the first device and the second device or dynamically discover the parameters of the direct communication connection between the first device and the second device.

19. The apparatus of claim 17, wherein the instructions to establish the direct communication connection between the first device and the second device are executable by the processor to cause the apparatus to:
establish the direct communication connection between the first device and the second device via a server in communication with the first device and the second device.

20. A non-transitory computer-readable medium storing code for data processing, the code comprising instructions executable by a processor to:
identify, within a real-time collaborative environment supported by a cloud platform, a first set of interactions with a first user interface of an application at a first device associated with a first user, the first set of interactions resulting in an action that is specific to the first user interface;

convert, within the real-time collaborative environment supported by the cloud platform, the first set of interactions with the first user interface of the application into a second set of interactions with a second user interface of the application at a second device associated with a second user different from the first user by using a first extension to capture the first set of interactions between the first user and the first user interface and using a second extension different from the first extension to convert the first set of interactions captured by the first extension into the second set of interactions with the second user interface, wherein the second set of interactions are different from the first set of interactions and result in a functionally equivalent action that is specific to the second user interface; and implement, within the real-time collaborative environment supported by the cloud platform, the second set of interactions at the second user interface of the application at the second device, thereby enabling the first user to collaboratively guide the second user through the application in real-time.

\* \* \* \* \*